(12) United States Patent
Barnes

(10) Patent No.: US 8,359,961 B2
(45) Date of Patent: Jan. 29, 2013

(54) PORTABLE VARIABLE-ANGLE CUTTING GUIDE

(76) Inventor: Nicholas John Barnes, Seaford (AU)

( * ) Notice: Subject to any disclaimer, the term of this patent is extended or adjusted under 35 U.S.C. 154(b) by 253 days.

(21) Appl. No.: 11/664,061

(22) PCT Filed: Sep. 29, 2005

(86) PCT No.: PCT/AU2005/001496
§ 371 (c)(1),
(2), (4) Date: Mar. 29, 2007

(87) PCT Pub. No.: WO2006/034552
PCT Pub. Date: Apr. 6, 2006

(65) Prior Publication Data
US 2008/0034596 A1    Feb. 14, 2008

(30) Foreign Application Priority Data

Sep. 29, 2004 (AU) ................................ 2004214621
Nov. 15, 2004 (AU) ................................ 2004100965

(51) Int. Cl.
*B27B 9/04* (2006.01)
(52) U.S. Cl. ........................................... 83/574; 83/745
(58) Field of Classification Search ................. 83/574, 83/745; 30/376
See application file for complete search history.

(56) References Cited

U.S. PATENT DOCUMENTS

| | | | | |
|---|---|---|---|---|
| 2,942,633 A | * | 6/1960 | King | 83/745 |
| 3,304,967 A | * | 2/1967 | Kujan | 83/574 |
| 3,645,307 A | | 2/1972 | Stocker | |
| 4,202,233 A | * | 5/1980 | Larson | 83/745 |
| 4,335,512 A | | 6/1982 | Sheps et al. | |
| 4,751,865 A | | 6/1988 | Buckalew | |
| 4,790,072 A | | 12/1988 | Edwards | |
| 4,945,799 A | * | 8/1990 | Knetzer | 83/745 |
| 6,708,422 B1 | * | 3/2004 | Stojanovski | 33/640 |
| 6,752,059 B1 | | 6/2004 | Posont | |

* cited by examiner

*Primary Examiner* — Stephen Choi
(74) *Attorney, Agent, or Firm* — Bio Intellectual Property Services LLC; O. M. (Sam) Zaghmout

(57) ABSTRACT

A portable cutting-guidance apparatus is used with a portable, hand-holdable power saw (20) to make an angle-cut in an object at a variably selected angle. A positioning device (300) is positioned motionless against the object being cut. The saw (20) travels on and along a cutting-guide (100) in a straight line. The linear cutting-guide (100) is pivotally connected to the positioning device (300) about a pivot point (400). The linear cutting guide (100) can be adjustably fastened to the positioning means (300) at a variably selected angle. The positioning device (300) can be positioned and held against the object purely by the manual force of the user, which includes force with which the user pushes the power saw forwards along the cutting-guide to cut the object. The pivot point (400) is located a distance (y) away from the leading edge of the linear cutting-guide (100) to provide improved performance.

17 Claims, 23 Drawing Sheets

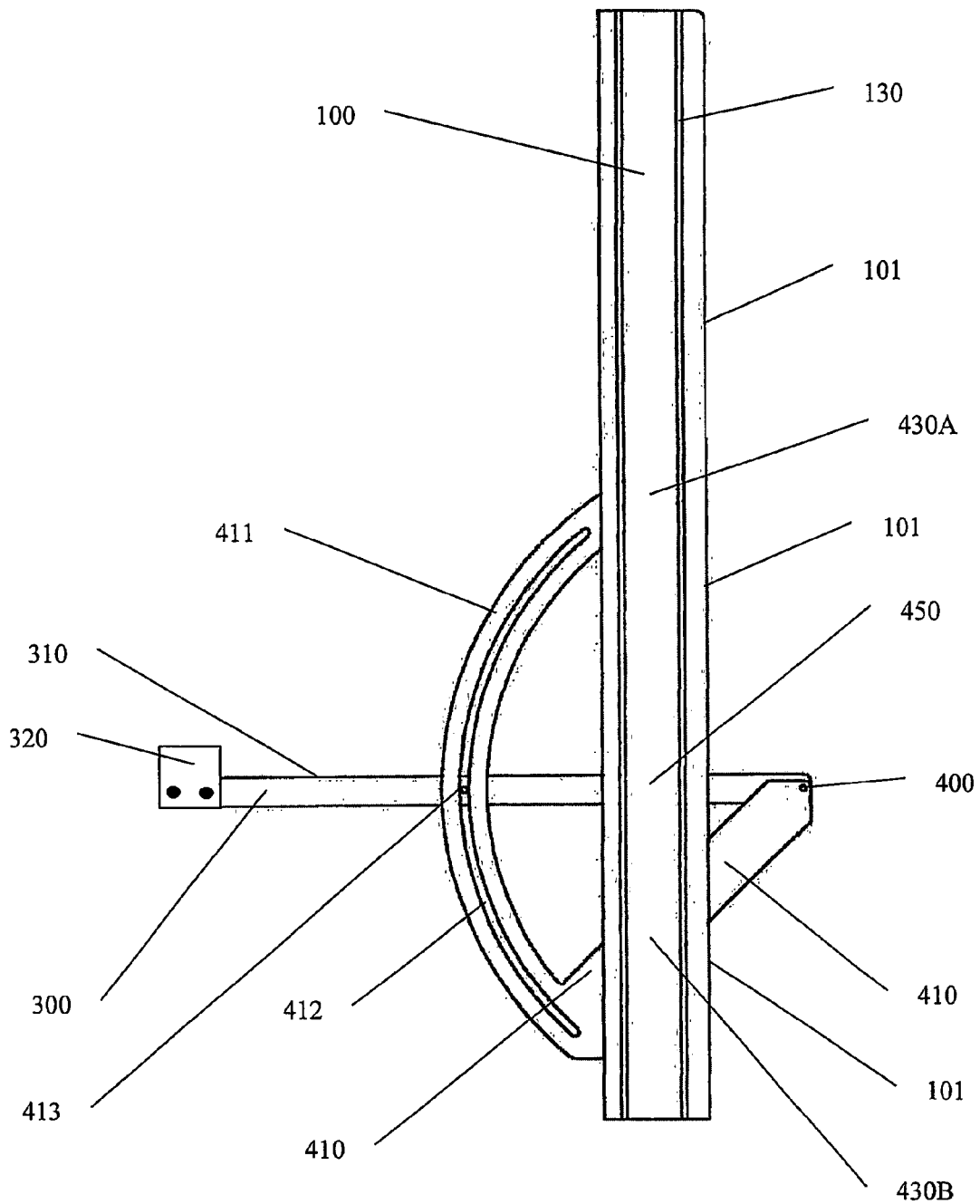
FIG. 3AAA

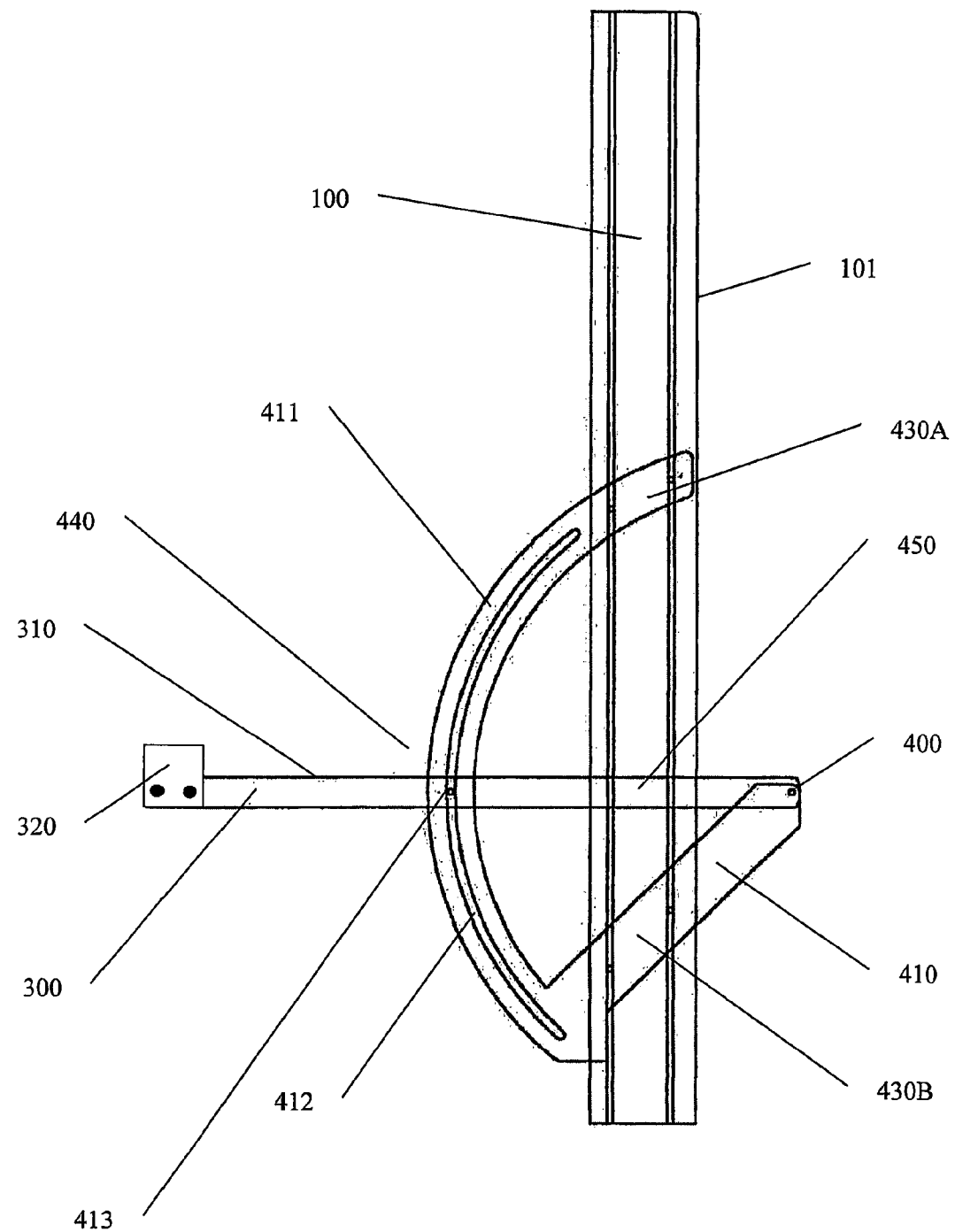
FIG. 3AAAA

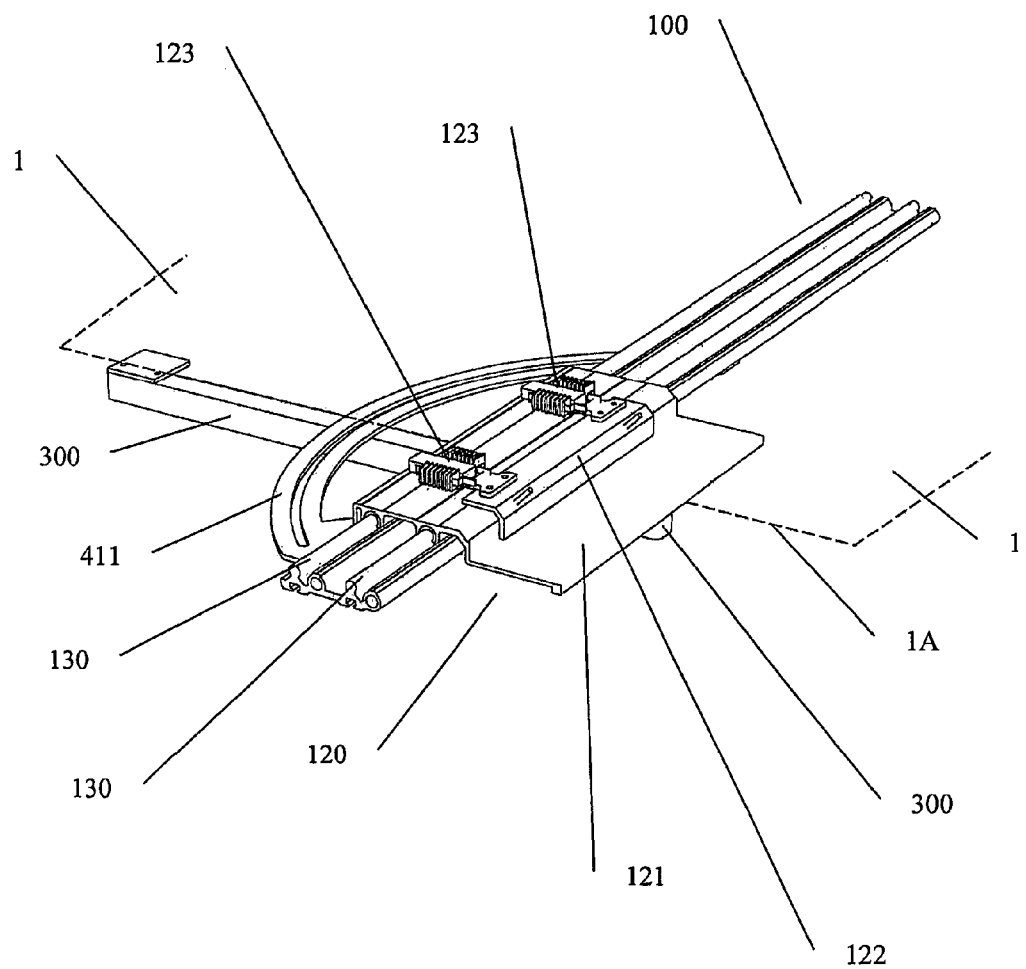
FIG. 4AAA

PORTABLE VARIABLE-ANGLE CUTTING GUIDE

FIELD OF INVENTION

The present invention relates to variable-angle cutting guides which enable a user to guide a hand-held power cutting tool, such as a portable electric saw, to make a straight linear cut which is at an angle.

The present invention specifically excludes use with non-portable power tools which are not originally designed for, and which cannot ordinarily be used as a hand-held portable tool. The present invention addresses deficiencies that are inherent in hand-held tools, which would not ordinarily tend to exist in non-portable tools.

BACKGROUND

When using a portable hand-held circular power saw to make a linear or straight cut in an object, such a piece of timber, the user attempts to push the power saw forwards by hand, along a linear path, to make the straight cut.

A problem with such portable, hand-held saws is that, as the saw is pushed forwards when making the cut, the user can find it difficult to manually control the saw precisely along the linear path. In other words, the cut, which ought to be perfectly straight, can end up being crooked. This deficiency is inherent in portable hand-held power saws because, as the rotating saw blade cuts through the timber, it exerts forces that tend to cause the saw to deviate from or veer off the intended linear path.

Problem: Clamping Leads to Loss of Time-Efficiency

To address the above problem of the saw veering away from the linear path, the prior art includes known saw guides that have a linear guide intended to help the user make straight cuts with a hand-held, portable, power saw.

Prior art examples of such saw guides are seen in U.S. Pat. No. 6,752,059 (Posont), U.S. Pat. No. 6,708,422 (Stojanovski) and U.S. Pat. No. 3,645,307 (Stocker).

A problem which is common to each of these prior art, however, is that each of these saw guides is designed to be clamped in place by some clamping implement. Typically, the saw guide is clamped or fastened motionless to the object which is to be cut.

The length of time needed for this clamping process can be, for example, anywhere from 30 seconds to perhaps more than a minute or so. This may not seem an excessive amount of time, but it must be remembered that professional carpenters often need to male around 300 or more of such angle-cuts per day. Thus, the extra 30-60 seconds or more per cut, needed to clamp the saw guide for each cut, when multiplied by 300 per day, would add about two to five extra hours per day.

Problem: Limitation of Range of Movement of the Saw

In prior art FIG. 1A, the saw 20 is shown at the beginning of its run, before it is pushed forward alongside the guide 10 with the intention of making a straight cut in an object 1. Often, the linear cut must be created at an angle to an external surface of the object ("angle cut"). For instance, a carpenter may need to make a cut which is at forty-five degrees with respect to an edge of the timber 1.

In prior art FIGS. 1B and 1C, in order to make an angle cut, the linear guide 10 is pivotally connected to an anchoring device 30. The anchoring device 30 is fastened motionless to the object 1 by a mandatory locking device 32. (Details of the locking device 32 are not shown in the drawings, and are merely drawn as a rectangle in the drawings, since, in the prior art, there is a range of suitable locking mechanisms). After the anchoring device 30 is locked to the object 1, the guide 10 is then oriented at a selected angle, and fastened to the anchoring device 30 at that angle. The user then pushes the portable power saw 20 against and alongside the linear guide 10 to create the angle cut in the object 1.

FIG. 1A shows the linear guide 10 perpendicular to the object 1, while FIGS. 1B and 1C show the same linear guide 10 arranged at other selected angles.

The point 40, where the linear guide 10 pivots about the anchoring device 30, is called the pivotal axis or the pivot point 40. For instance, in prior art FIGS. 1A, 1B and 1C, the pivot point 40 is found an intersection 450 of the linear guide 10 and the anchoring device 30. Specifically, the pivotal axis 40 passes through some part of the linear guide 10. In other words, there is no separation or distance between the linear guide 10 and the pivot point or pivotal axis 40, and this causes a problem in the prior art.

To explain the problem, by way of background, it is noted that in FIGS. 1A, 1B and 1C, the line of cut 21 is parallel to, but distanced from the linear guide 10, shown as the distance x in FIG. 1A. As mentioned above, this is because saw blades 13 in right-hand, portable power saws usually lie in a plane that is located proximate the right-hand side of the saw's housing. (The drawing assumes the saw 20 is a more common right-hand saw for right-handed users, rather than the rarer left-hand saw).

The problem, which stems from the lack of separation of the guide 10 and the axis 40, may not be apparent from FIGS. 1A and 1B, because there the saw 20 is able to move sufficiently back along the guide 10 for the saw blade to be clear of the object 1. (In FIGS. 1A, 1B and 1C, the edge of the saw blade 13 is located proximate an area identified by numeral 20A). In FIGS. 1A and 1B, prior to the saw 20 commencing the cut, the location 20A of the blade of the saw faces the object 1. (The words "faces" or "facing" in this context refer to the saw before it is pushed to commence its cut, as the saw "faces" the object in, for instance, FIGS. 1A, 2A and 3A).

The problem, however, is more evident in the arrangement in FIG. 1C where the guide 10 is arranged at an acute angle with respect to the object 1, with the saw 20 positioned at the beginning of the guide 10, where it would be located before it begins its cutting motion along the guide.

The problem in FIG. 1C is that the saw 20 is too close to the object 1, even when the saw 20 is pulled as far back along the guide 10 as possible. (The problem pertains to the part of FIG. 1C around reference numeral 25). In FIG. 1C, even if the saw 20 were to be drawn as far back as possible along the guide 10, the location 20A of the blade is positioned over and above the object 1 itself, rather than facing the object as in FIGS. 1A and 1B.

A circular saw cannot commence a cut when positioned over and above the object 1, which is the problem of FIG. 1C. Ideally, before the cutting commences, there must be a space between the circular blade 13 of the saw 20 and the object 1, so that the commencement of sawing involves pushing the rotating blade into the object 1. This is impossible in FIG. 1C, because the saw 20 cannot be drawn back far enough, while maintaining sufficient stability from the guide 10.

An imperfect solution to the problem of FIG. 1C is to extend the length of guide 10 backwards, to enable the saw 20 to be placed further away from the object, as shown in FIG. 1CC. This enables the location 20A of the leading edge of the saw blade to be face the object 1 before commencement of cutting. While this partially solves the problem, it is, however, an imperfect solution, because it would result in a longer starting-end for the guide 10.

(Compare FIG. 1C with FIG. 1CC, with the latter drawing showing the longer guide 10). In FIG. 1CC, if the saw 20, which is relatively heavy, is positioned a greater distance from the support of the anchoring device 30, it would potentially lead to a more unstable cantilever 10A. Having the saw 20 perched at the end of a long, unstable cantilever 10A, is not an ideal position for the user to commence pushing a power saw along the guide.

The problem in FIG. 1C is found in a number of prior art saw guides, such as U.S. Pat. No. 3,645,307 (Stocker). In FIG. 1 of Stocker, the pivotal axis of the base frame 11, relative to the guide rail 40, is located at an intersection of two components. The pivotal axis is shown by numeral 54 in FIG. 1 of Stocker. In Stocker's saw guide, there is no separation of the guide and the pivotal axis. Thus, Stocker is susceptible to the problem of FIG. 1C of the present specification, because of the problematic location of the pivotal axis in Stocker.

Another example of this problem is in the abovementioned U.S. Pat. No. 6,708,422 (Stojanovski). In FIGS. 2 and 9 of Stojanovski, the pivot point or pivotal axis passes through part of the linear saw guide. In other words, there is no separation of the pivotal axis or pivot point from the linear saw guide.

In this regard, in Stojanovski's drawings, the bolt 248 passes through main pivot holes 152, 170, and through a small semi-circular cutaway in the arm assembly 38. Thus, the Stojanovski patent is also susceptible to the problem in FIG. 1C of the present specification, if the saw 20 were to be pushed in a direction that urges the anchoring device 30 towards the object 1.

Stojanovski avoids the problem of the present FIG. 1C by have the saw come from the other direction, but in so doing creates another problem.

To explain this, FIG. 1D illustrates a simplified representation of Stojanovski. In FIG. 1D, the force with which the user pushes the saw 20 will, particularly at certain angles, include a force component 23 that has the effect of urging the anchoring device 30 away from the object 1. Therefore, to operate the Stojanovski saw guide, it is mandatory that its anchoring means must be locked or clamped to the object by some form of locking mechanism 32. For instance, in FIG. 1 of Stojanovski, the saw guide cannot function if the fixed arm assembly 35 is not locked or clamped to the object.

In Stojanovski, for each cut, the step of un-clamping and re-clamping the fixed arm assembly to the object may take only perhaps 30 to 60 seconds. But it must be remembered that professional carpenters often need to make around 300 or more angle-cuts per day. An extra 30-60 seconds per cut, multiplied by 300 per day, would add about two to five extra hours per day. Therefore, the mandatory locking or clamping device in Stojanovski, and also in Stocker mentioned above, and in other known prior art saw guides, wastes a significant amount of time when used in high volume situations faced by professional carpenters, builders and other such tradesmen.

Another problem in Stojanovski, and other known prior art saw guides, is that the portable power saw is not attached to the linear guide (the variable angle arm assembly 38 of Stojanovski's FIG. 1). Hence, when making a cut, the user, as well as pushing the saw forwards, must also push the saw sideways to maintain the saw against the linear guide. (In prior art FIGS. 1A, 1B, 1C, 1CC and 1D of the present drawings, this sideways force, exerted by the user to keep the saw against the saw guide, is represented as arrow 22).

Firstly, this sideways force 22 is another reason why a clamping or locking device is mandatory in Stojanovski. In the present FIG. 1D, without such clamping, the sideways force 22, and its force components 23, would push the anchor device 30 out of alignment.

Secondly, in practice, the sideways force 22 exerted by the user may be adequate to maintain the saw 20 against the guide 10, and insufficient to ensure a perfectly straight cut. This is because rotating circular saws, in hand-held power saws, can often bite into the material and exert forces which cause the circular saw to veer off course, particularly if the user's sideways force 22 is insufficient.

In the prior art, the problem of simple saw guides, which are not connected to the saws, is exacerbated in the case of variable-angle saw guides. Since the guides 10 can be oriented at many different angles, there is likewise a great variation in the direction of the sideways forces 22 needed to keep the saw 20 abutted against the guides 10. Therefore, in the prior art, the use of locking or clamping mechanism in these prior art variable-angle guides is mandatory. For instance, both Stocker and Stojanovski require such mandatory locking or clamping mechanisms. And, as mentioned, the short time needed to clamp the anchoring device to the object can waste literally several hours each day for a professional carpenter needing to make several hundred angle-cuts per day.

An object of the present invention is to overcome or at least ameliorate one, or preferably more than one, of the abovementioned problems in the prior art of portable cutting guides, or to provide an improved alternative.

Description and discussion of prior art in this specification should not be taken as an admission that any one, or any combination of the prior art, is part of the common general knowledge of the skilled addressee.

SUMMARY OF INVENTION

According to the present invention, there is provided a portable cutting-guidance apparatus adapted to be used with a portable power cutting-tool that has a cutting implement which cuts an object at a variably selected angle, including:

a portable positioning means adapted, in use, to be positioned motionless against an object to be cut by a portable power cutting-tool; and a linear cutting-guide adapted to enable the portable power cutting-tool to travel on and along the cutting-guide in a straight line;

the linear cutting-guide being pivotally connected to the positioning means about a pivot point by a variable-angle mechanism that is adapted to adjustably fasten the cutting-guide to the positioning means at a variably selected angle relative to one another, such that, in use, the portable power cutting-tool is able to travel on and along the cutting-guide to cut the object in a straight line at the variably selected angle;

the positioning means including an abutment surface adapted, in use, to abut the object so as to position the positioning means motionless relative to the object, and the positioning means adapted, in use, to be positioned and held against the object by manual force of the user, the manual force including force with which the user pushes the portable power cutting-tool forwards along the cutting-guide to cut the object, wherein the portable cutting-tool is removably attachable to the linear cutting guide such that the cutting-tool is able to reciprocate back and forth along the cutting-guide while attached thereto, and wherein the cutting-guide is provided with a cutting-tool support adapted to travel along the cutting-guide, and adapted to have the portable cutting-tool attached thereto such that, in use, when the cutting-tool is attached to the linear saw guide, the user is able to lift and operate with one hand the entire portable cutting-guidance apparatus as one integral unit with the cutting-tool attached.

For example, since the portable apparatus can be positioned by manual force alone, it enables the user to proceed from making one cut to the next, where the in-between time from one cut to the next cut may take a handful of seconds, typically around 5 to 10 seconds, or thereabouts. This allows a dramatic increase in time-efficiency, because if the user were a professional carpenter making, say, 300 such cuts a day, the total time per day spent aligning the cuts is dramatically shorter, compared to the several lost hours if using the prior art saw guides discussed above which require time to set up the clamping before each cut is made. This dramatically short time, between performing one cut to the next cut, is impossible when using prior art saw guides that are required to be bolted or fastened in place, Preferably, the positioning means is adapted, in use, to be positioned and held against the object without requiring a locking means that would otherwise lock the positioning means to the object.

Preferably, the linear cutting-guide has a leading edge which, in use, is closest to the cutting implement, and wherein the pivot point is distanced from the leading edge of the cutting-guide such that the entire leading edge is able to pivot around and about the pivot point.

Preferably, the pivot point is distanced from an intersection of the cutting-guide and the positioning means.

Preferably, in use, the user cuts the object by pushing the portable power cutting-tool on and along the cutting-guide, and not by pulling.

Preferably, the user is able to lift the integral unit by grasping the cutting-tool in a manner in which the cutting-tool is designed to be handled as a portable tool.

The cutting-guide may include a glide mechanism that allows the cutting-tool support to travel smoothly along the cutting-guide with a degree of friction.

The glide mechanism may include one or more linear ribs on the cutting-guide surface on which corresponding one or more grooves located on an under-surface of the cutting-tool support are able to glide.

Alternatively, the glide mechanism may include one or more linear grooves in the cutting-guide surface in which corresponding one or more ribs located on an under-surface of the cutting-tool support are able to glide.

Alternatively, the glide mechanism includes bearing guides.

The cutting-tool support may be provided with a releasable fastening means adapted to releasably fasten the cutting-tool to the cutting-tool support.

The releasable fastening means may include a clamping mechanism that clamps around a rim of the cutting-tool.

The cutting-guide and the cutting-tool support may be positioned above the positioning means such that the cutting-tool support is able to pass across the positioning means without hindrance as it travels along the cutting-guide.

The cutting-tool support may be able to reciprocate back and forth on and along the cutting-guide.

When the portable cutting-tool is attached to the cutting-tool support, the cutting implement may be distanced from the leading edge of the cutting-guide by a measure that is substantially equivalent to said distance between the pivot point and the leading edge of the cutting-guide.

The measure may exceed the distance by approximately 9 mm to 15 mm depending on the size of the housing of the saw.

The cutting-tool may have a line of cut which, when the cutting-tool is located on the cutting-tool support, passes through or substantially close to the pivot point.

The pivot point may be located on the positioning means. The variable-angle mechanism may include a curved-support which supports the cutting-guide as the cutting-guide pivots relative to the positioning means through a range of selectable angles.

The curved-support may be calibrated with markings of angle measurements. The variable-angle mechanism may include a position-locking means to lock the cutting-guide in the selected angle.

The cutting-tool may be a hand-portable, power saw. The cutting-guide may be provided with an extension and refraction mechanism to enable selective variation of the length of the cutting-guide.

According to yet a further aspect of the invention, there is provided a method of using a portable cutting-guidance apparatus, as described above, that has a cutting implement to cut an object at a variably selected angle, the method including:

removably attaching a portable power cutting-tool to a linear cutting-guide that is adapted to enable the portable power cutting-tool to travel on and along the cutting-guide in a straight line, wherein the linear cutting-guide is attached to a. portable positioning means;

pivotally adjusting a variable-angle mechanism about a pivot point to adjustably fasten the cutting-guide to the positioning means at a variably selected angle relative to one another, using manual force to position an abutment surface of the portable positioning means motionless relative to the object; and using said manual force to also move the portable power cutting-tool on and along the cutting-guide to cut the object in a straight line at the variably selected angle.

The portable power-tool itself is not included in the scope of the invention. The invention is the accessory apparatus that is adapted to work with the portable, hand-held, power-tool. In other words, the invention is for the portable cutting-guide, and does not include the actual portable power saw itself

DRAWINGS

In order to understand the background of the present invention, certain problems and issues in the prior art have been described with reference to the following drawings:

FIGS. 1A, 1B and 1C are figurative illustrations of a notional, prior art variable-angle saw guide, showing the same saw guide in different angle orientations, the problem being more evident in FIG. 1C;

FIG. 1CC illustrates an imperfect solution to the problem in FIG. 1C; and

FIG. 1D illustrates problems with another approach found in the prior art, where FIG. 1D is a simplified version of the said Stojanovski apparatus.

In order that the present invention might be more fully understood, embodiments of the invention will be described, by way of example only, with reference to the accompanying drawings, in which.

Figure 3A:
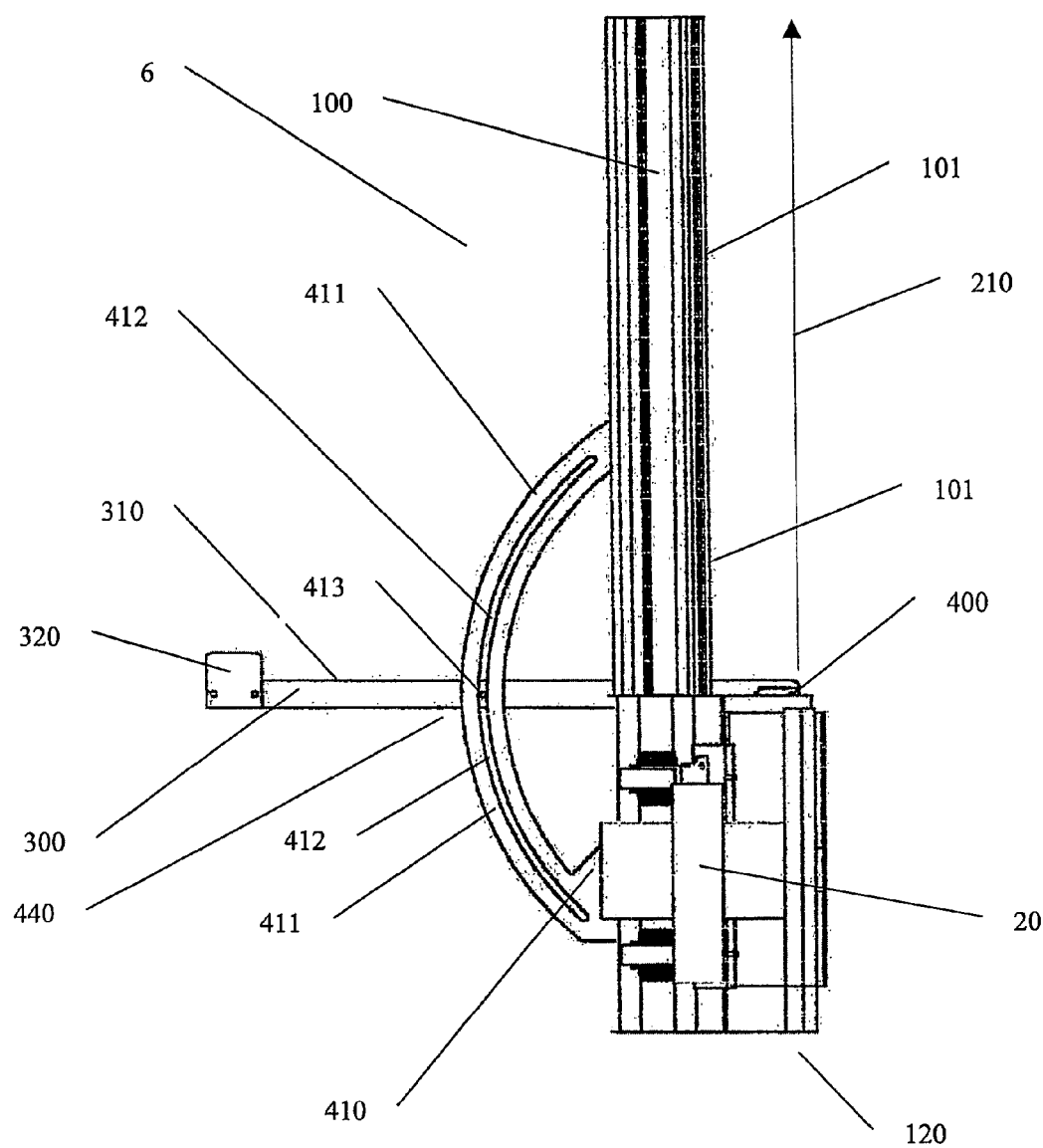
FIGS. 3A, 3B and 3C show a second embodiment of a portable, variable-angle saw guide of the present invention which has a track-runner mounted on the track, and in which the saw is attached to the saw guide by being initially attached to the track-runner.
Figure 3A:
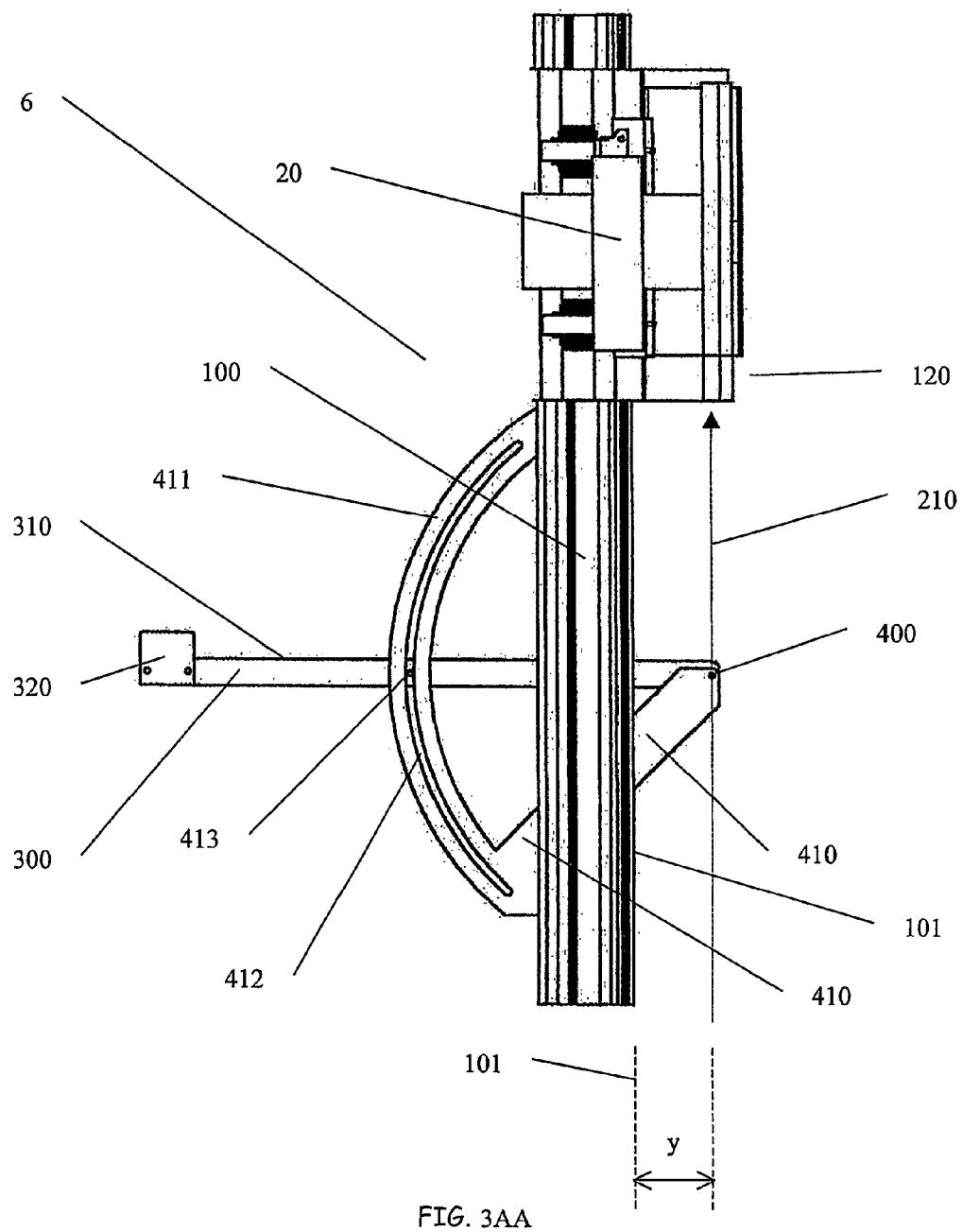
Figure 4A:
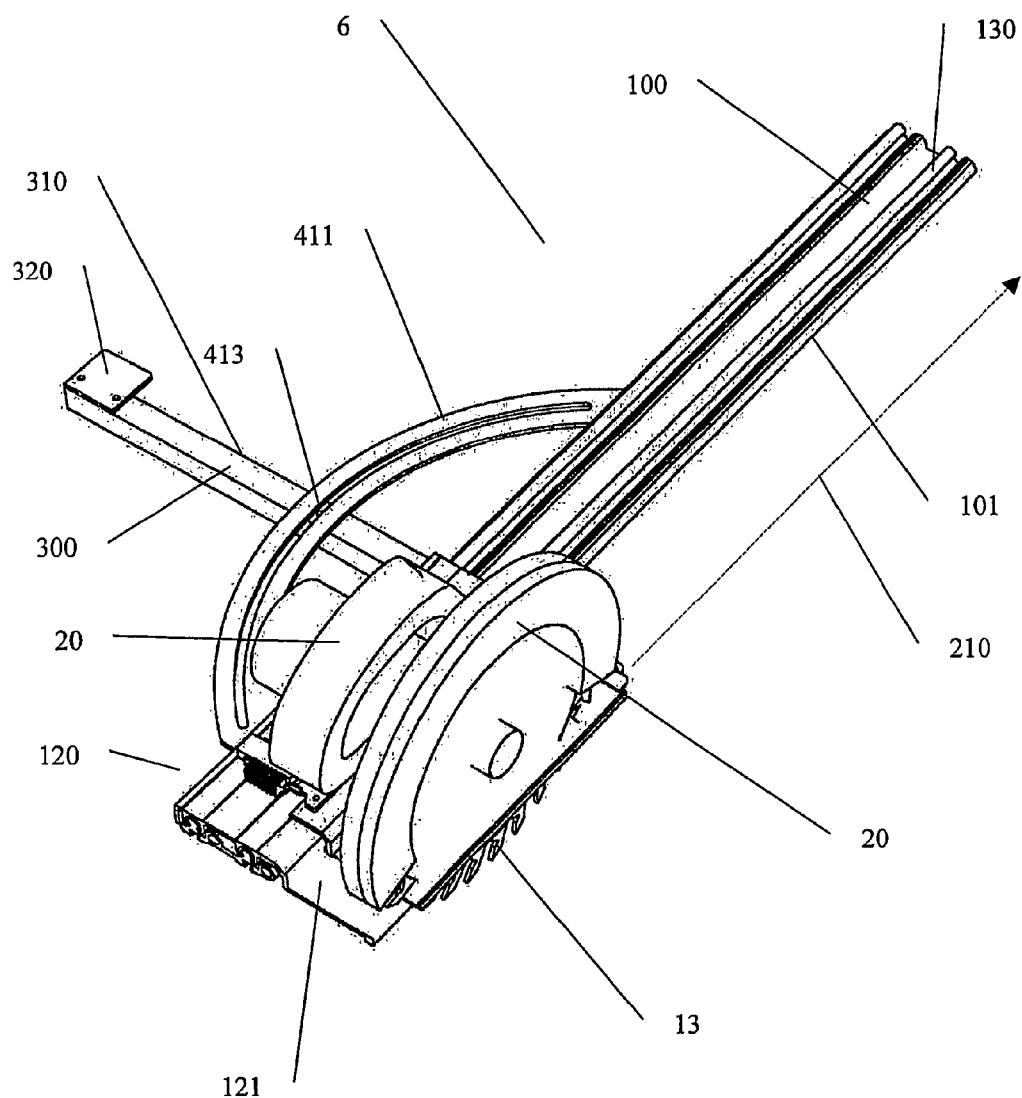
Figure 4A:
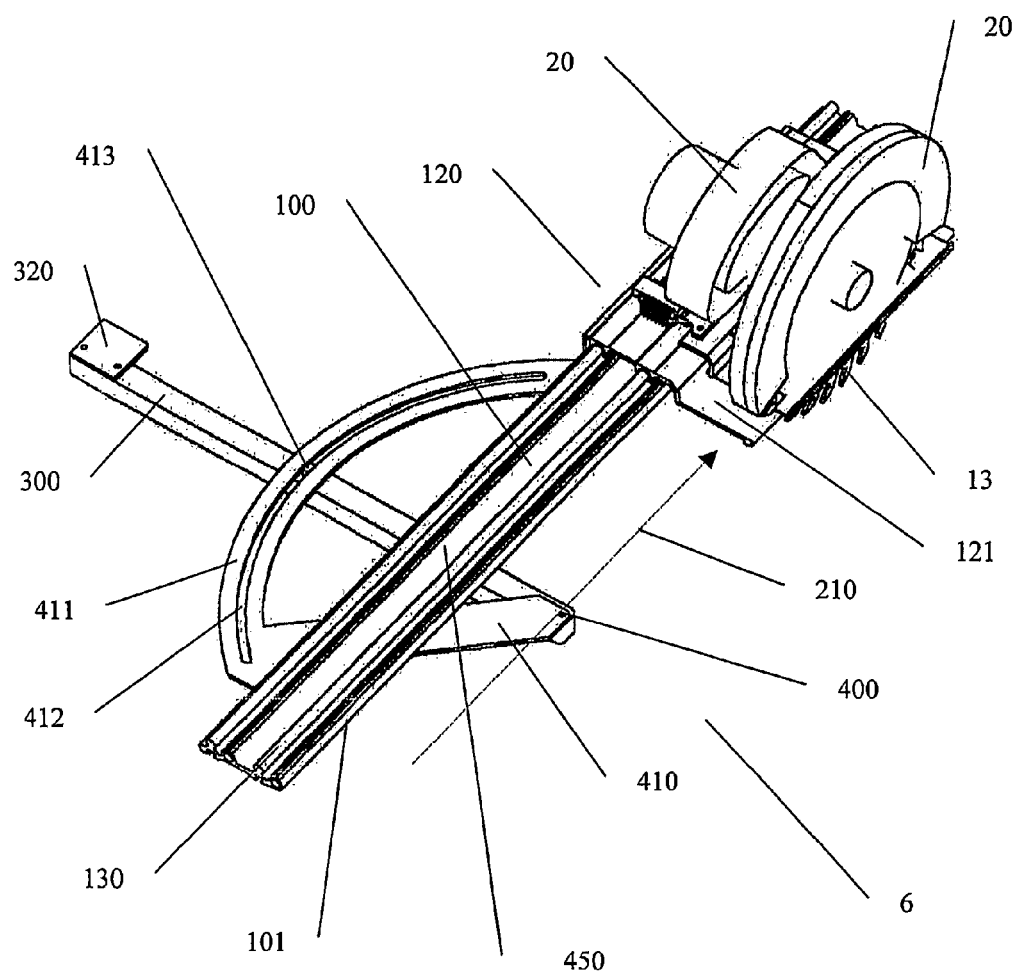
Figure 5A:
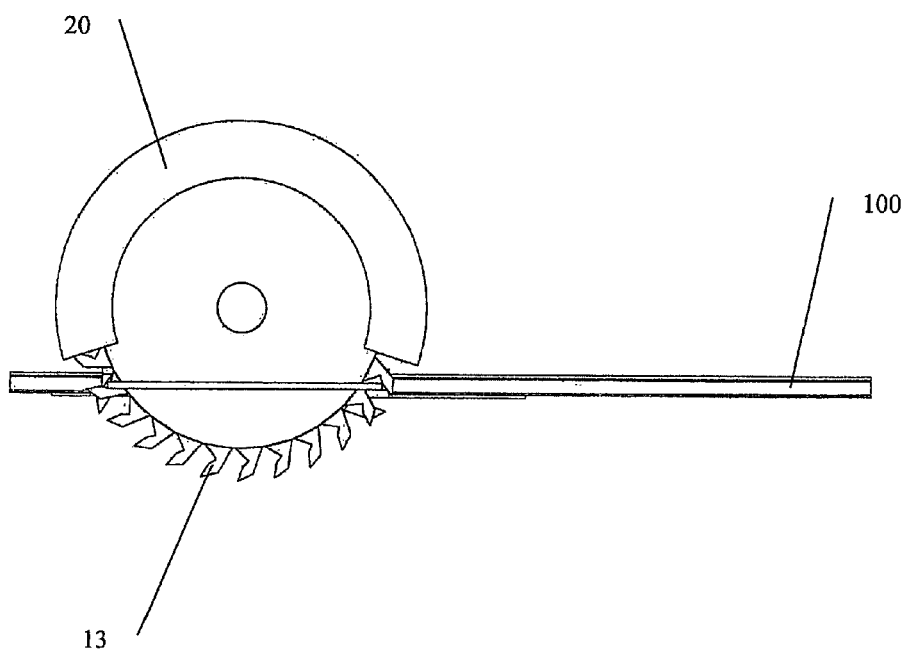
Figure 5B:
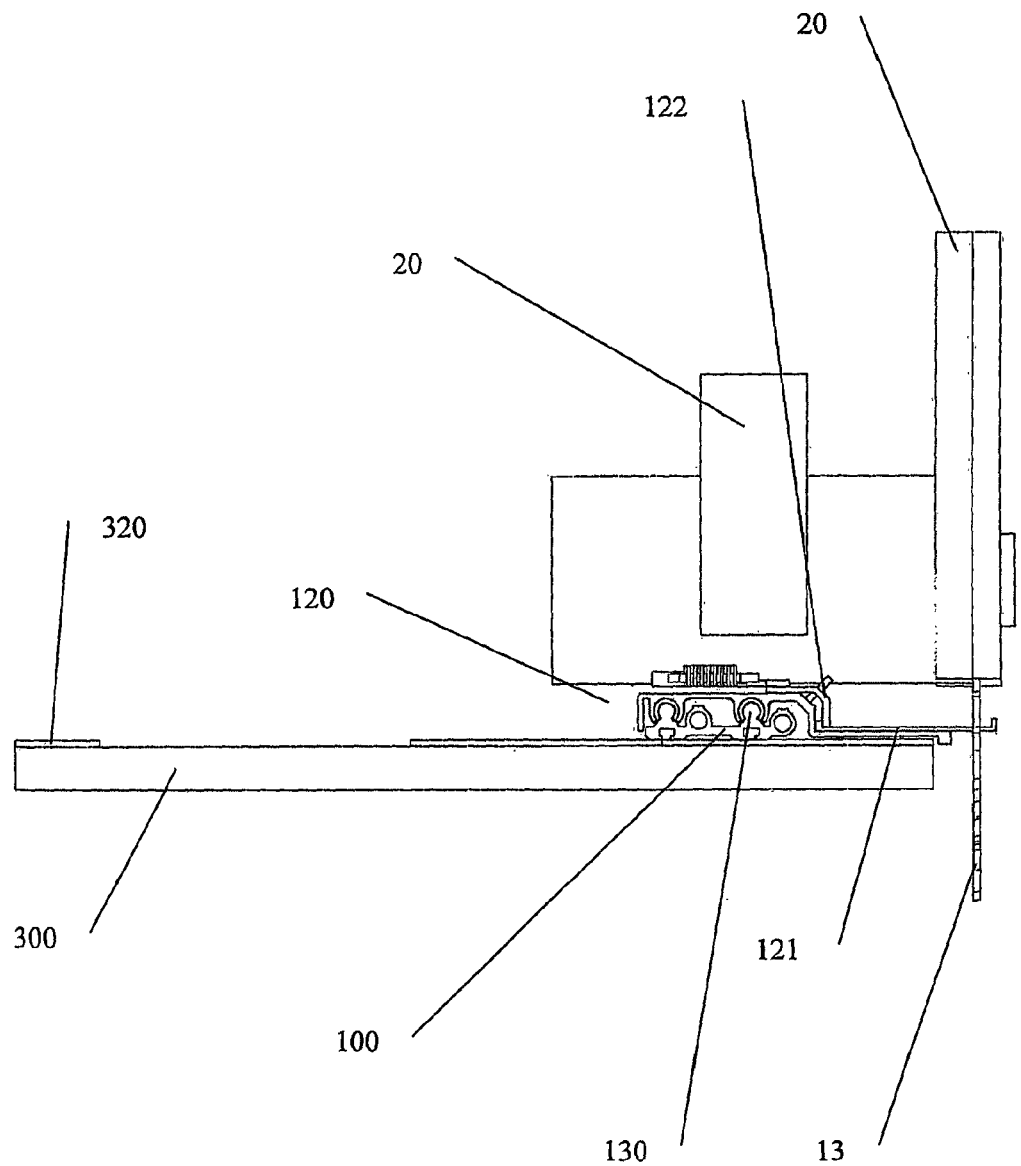
Figure 6A:
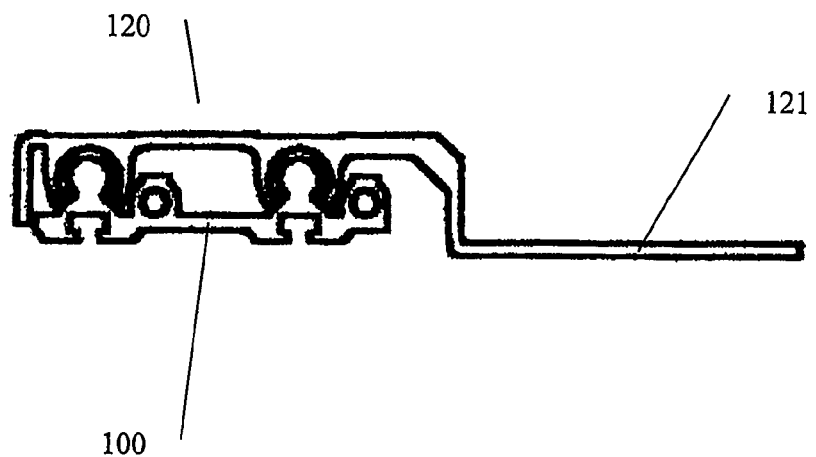
Figure 6B:
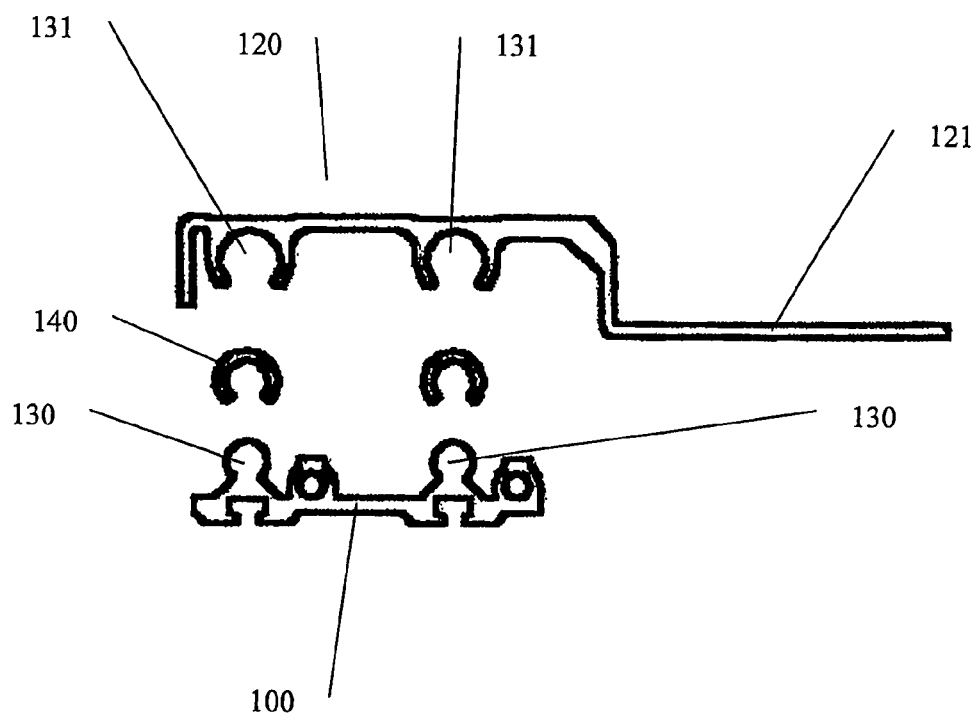
Figure 7:
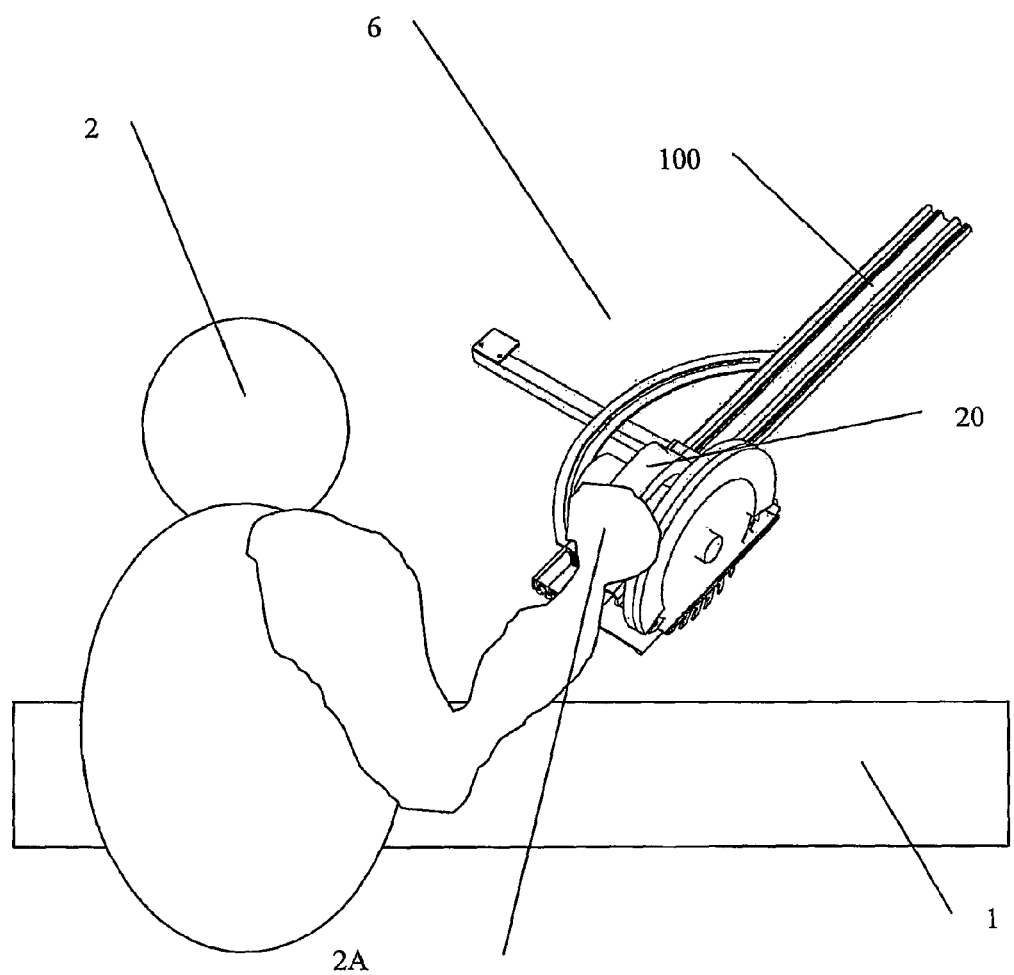

FIG. 3AA illustrate the same embodiment as FIG. 3A, except with the track-runner positioned at the upper-end of the track;

FIG. 3AAA shows a plan view of the embodiment of FIGS. 3A except with the track-runner removed in order to reveal the structure of the underlying apparatus;

FIG. 3AAAA shows the same plan view of FIG. 3AAA except with outlines of each of the components drawn in bold, for the sake of showing the complete shape of certain parts which are otherwise hidden in FIG. 3AAA;

FIG. 4A is a perspective view of the embodiment of FIG. 3A showing the saw mounted on the track-runner, with the track-runner positioned at the lower-end or start of the track;

FIG. 4AA is a perspective view of the same embodiment of FIG. 4A, except here the track-runner and saw are positioned at the upper-end or finish of the track;

FIG. 4AAA shows a perspective view of the same embodiment of FIG. 4A, except here the track-runner is illustrated without the saw mounted thereon, so that features of the track-runner can be seen clearly. (In this figure, the outline of the object is shown in one dimension for simplicity, without showing the object's height);

FIG. 5A is a side view of the saw guide of the second embodiment in FIGS. 3A and 4A;

FIG. 5B is a front view of the saw guide of the second embodiment in FIGS. 3A, 4A and 5A;

FIG. 6A shows a front view of an embodiment of a track-runner, illustrated when it is mounted on the track;

FIG. 6B shows an exploded side view of the track-runner and track of FIG. 6A; and FIG. 7 shows a user using his right hand to grasp the saw and thereby lift the entire assembly of the portable cutting-guidance apparatus in FIG. 4 as one integral unit with the portable saw attached. The drawing shows the user holding the assembly well away from the object to illustrate that the assembly is portable with one hand.

In the accompanying drawings, the saw 20 is either represented in bold lines or dotted lines, depending on whether features, underlying the saw, need to be revealed in the drawing.

In the accompanying drawings, like parts in different embodiments have been labelled with like reference numerals, merely for ease of understanding the concepts of the embodiments.

By way of background: hand-held circular power saws are designed to cut by being pushed forward, never or highly unlikely, by being pulled backwards. Hence, in the accompanying drawings, the forward direction in which a user 2 pushes the saw 20, when making the cut, is represented by a unidirectional dotted arrow 21. Also, in right-handed circular saws, designed for use by right-handed users, the saw blade is usually positioned proximate the right-hand side of the saw housing (for instance, see the location of the saw blade 13 in FIG. 4A). Hence, in the appended drawings, the arrow 21 emanates from around the right-hand side of the saw 20.

DESCRIPTION OF EMBODIMENTS

First Embodiment

Figure 2A:
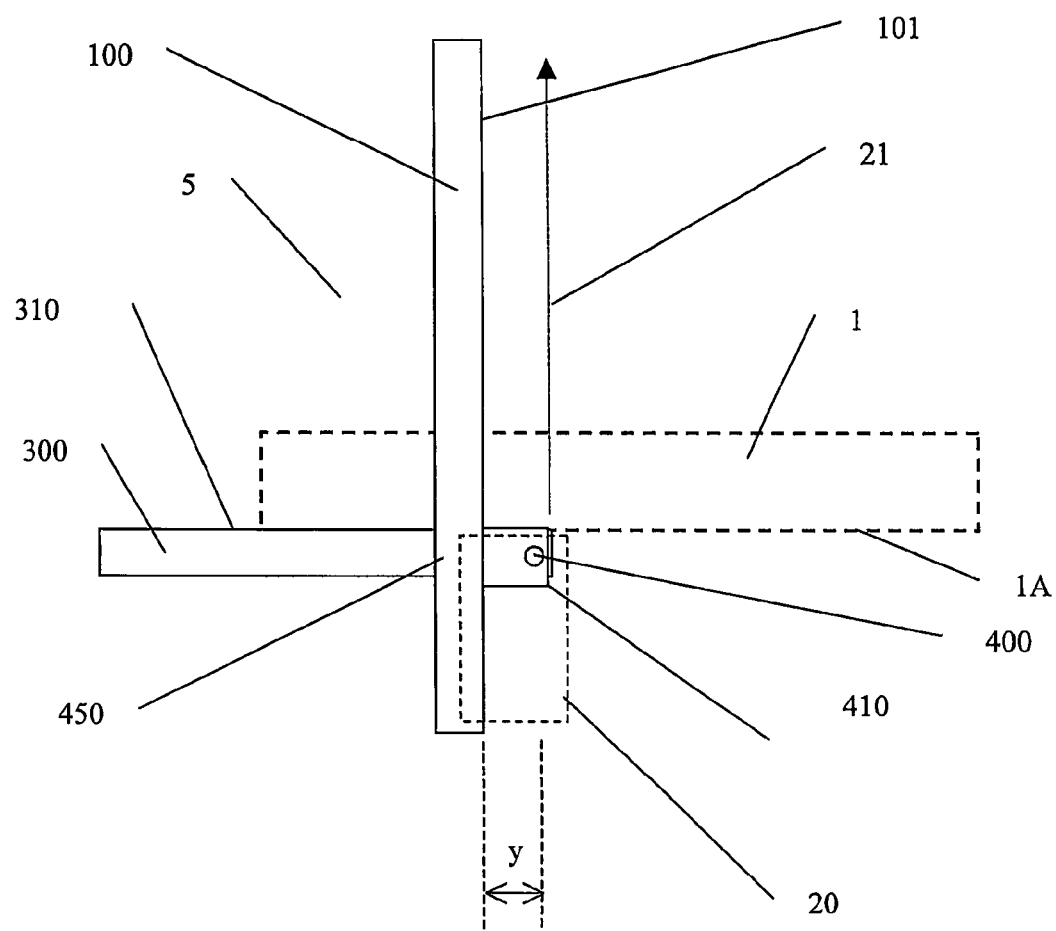
FIGS. 2A, 2B and 2C show an embodiment of a portable, variable-angle saw guide of the present invention, each figure showing the same saw guide at a different selected angle.

Referring to the accompanying drawings, FIG. 2A shows a first embodiment of a portable cutting-guidance apparatus in the form of a saw guide 5.

The saw guide 5 in FIG. 2A is used with a portable, power cutting-tool to cut an object 1 at a variably selected angle.

In the embodiment, the portable power cutting-tool is a hand-held circular power saw 20. (In FIGS. 2A, 2B and 2C, the saw 20 is represented in dotted outline, so that the position of the pivot point 400 and surrounding components are revealed in the drawings. The drawings assume a more common right-hand saw for right-handed users).

The Track

The saw guide 5 in FIG. 2A includes a linear cutting-guide in the form of a track 100. The track 100 allows the saw 20 to travel on and along the track in a perfectly straight line. The saw 20 reciprocates back and forth along the track 100.

In the embodiment, in use, the saw 20 is removably attachable to the track 100. Thus, because of this attachment, the user avoids the need to apply a sideways force 22 to maintain the saw in position against the track, as is the case of prior art FIGS. 1A to 1D.

In the exemplary embodiment of FIG. 2A, the attachment of the saw 20 to the track 100 can be achieved in a variety of ways, provided that the attachment allows the saw to reciprocate back and forth along the track 100 while attached to the track, and provided it avoids the need for the sideways force 22.

Figure 2B:
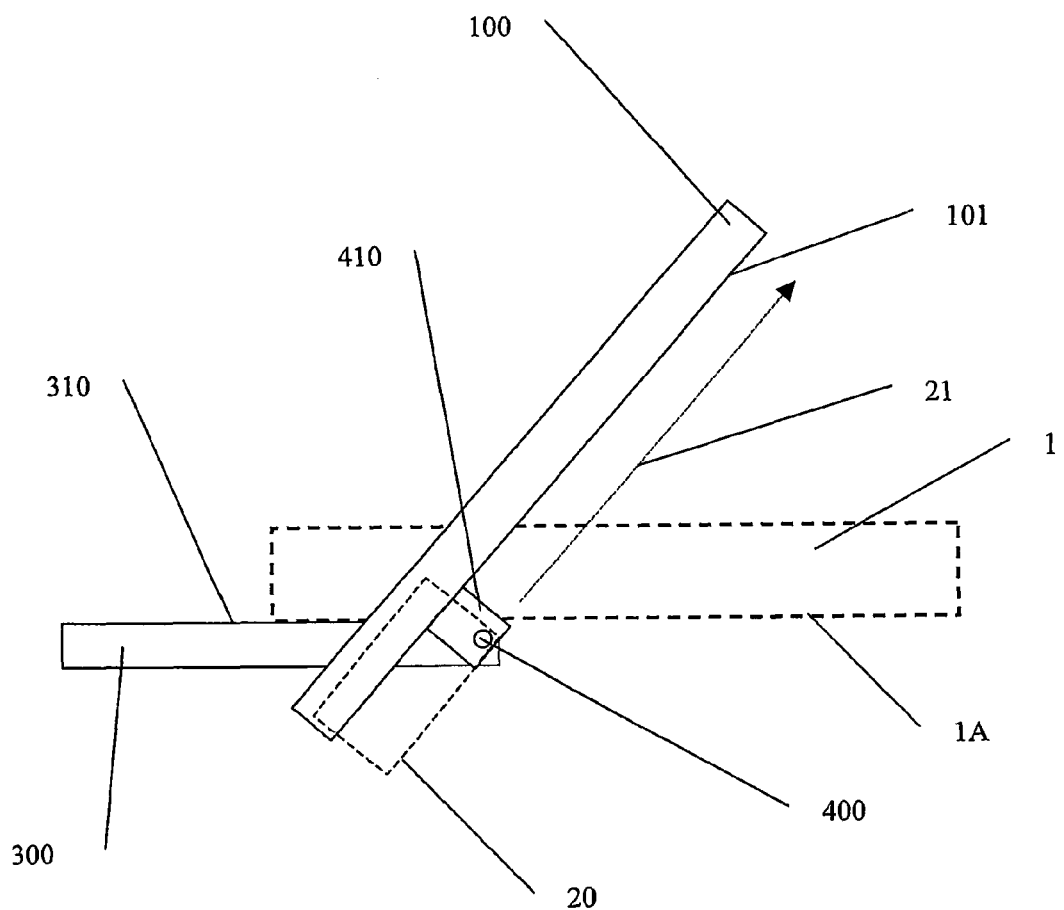
Figure 2C:
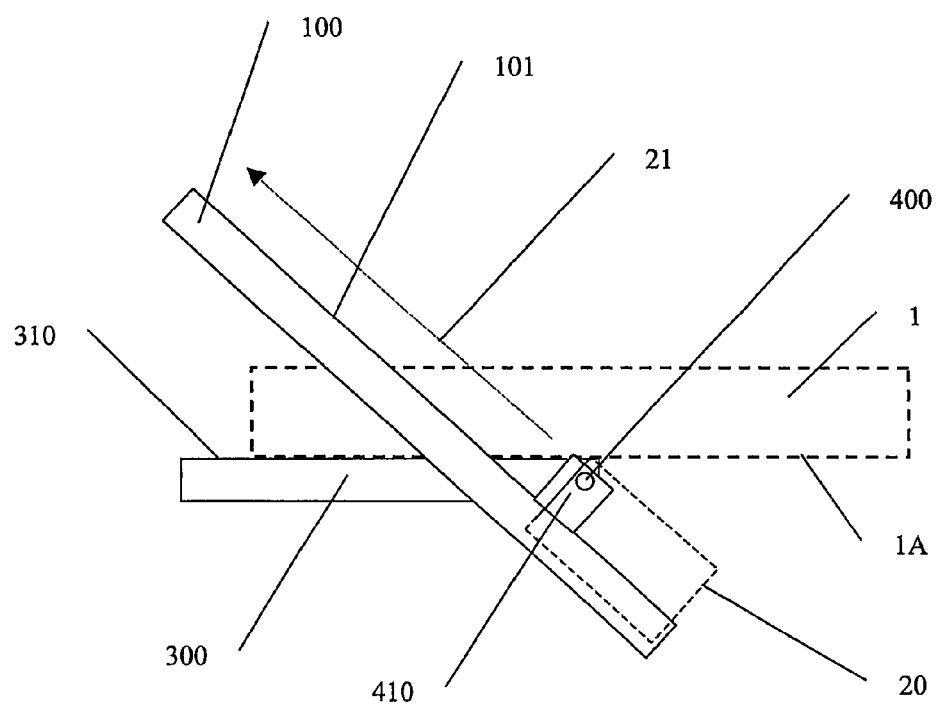
Figure 2D:
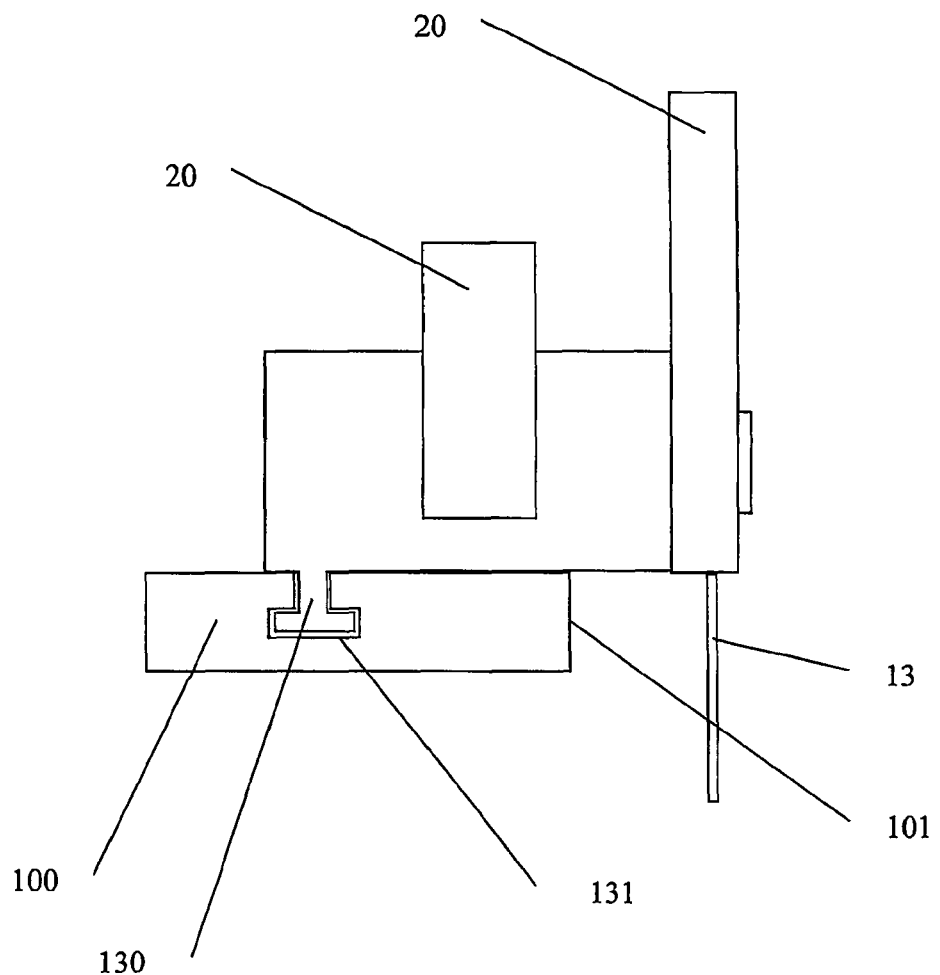
FIG. 2D shows a front cross-sectional view of the embodiment of FIG. 2A where the saw is attached to the track.

For example, in the side view of FIG. 2D, the track 100 may be provided with a groove 131 that accepts therein a linear strip-projection 130 that is found on the under-surface of the housing of the saw 20. The linear strip-projection 130 runs in the elongated groove 131. The projection 130 has a T-shaped cross-section which prevents the projection 130 from being lifted off the track 100. The T-shaped projection 130 is attached to the track by being inserted into the groove 131 at either end of the track 100.

The embodiment in FIG. 2D is merely an example, and other modifications are possible which enable the saw 20 to reciprocate back and forth along the track 100 while attached to the track.

Figure 2E:
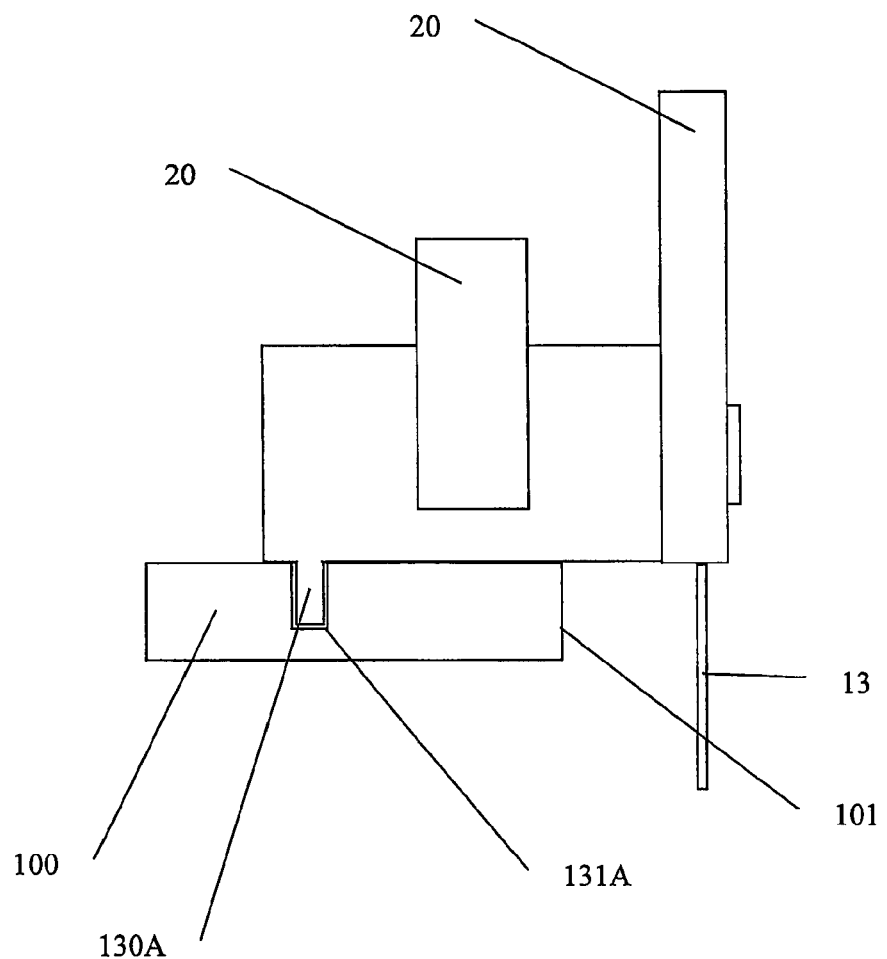
FIG. 2E shows a front cross-sectional view of a further variation in which the saw is attached to the track, being guided by the track, but without a restraining connection.

For example, in the side view of the variation in FIG. 2E, the track 100 is provided with a groove 131A that accepts an linear strip-projection 130A that has been attached to the under-surface of the saw 20. The strip-projection 130A runs in the groove 131A. Thus, the user need not apply a sideways force 22, since the linearity of the groove 131A in the track ensures that the saw 20 will move straight along the track without sideways deviation, either to the right or left. In that sense, therefore, the saw 20 is said to be attached to the track 100 because there is a degree of restraint offered by the groove 131A in FIG. 2E.

In this variation of FIG. 2E, however, the user can easily lift the saw 20 off the track 100. Hence, the user may need to apply a slight downwards force, if at all.

In another modification of this embodiment, the track 100 is provided with a cutting-tool support that travels along the track, and is designed to attach the saw 20 to the track 100. When the saw 20 is attached to the track 100, the user is able to lift, with one hand, the entire portable cutting-guidance apparatus as one integral unit with the saw attached.

The Fence

The saw guide 5 of FIG. 2A also includes a positioning-means in the form of a fence 300. The fence 300 is portable. In the embodiment of FIG. 2A, the fence 300 is an elongated flat piece that is adapted, in use, to be positioned motionless relative to the object 1.

In the embodiment of FIG. 2A, the fence 300 does not extend substantially beyond the pivot point 400 on the side where the saw passes back and forth, so that the fence does not intrude on the line of cut 21 of the saw blade.

The fence 300 has an abutment surface in the form of a flat face 310 that runs along substantially the entire front face of the fence 300. In use, this elongated flat face 310 is positioned flush with, and abuts against a flat surface 1A of the object 1. The user presses the flat front-face 310 of the fence 300 so that it abuts the flat surface 1A of the object 1, thereby positioning the fence 300 motionless relative to the object 1.

The fence 300 can be positioned correctly in place, by being held against the object 1 by the user's manual force.

In the embodiment, the manual force includes the force with which the user pushes the saw 20 forwards along the track 100 to cut the object 1.

The user cuts the object by pushing the saw 20 on and along the track 100, and not by pulling. Thus, the manual force that the user exerts to push the saw along the track 100, also serves a secondary purpose of keeping the fence 300 pressed against the flat surface 1A of the object 1.

In the embodiments of FIGS. 2D and 2E, there is a degree of friction between the grooves 131, 131A and the projections 130, 130A. This friction enables part of the force, that is used to push forward the saw, to also be used to push the fence 300 against the object 1.

Since the fence 300 is able to be positioned and held against the object 1 solely by the manual force that the user exerts when pushing the saw forwards, there is therefore no mandatory requirement for a locking means, which might otherwise be needed to lock the fence 300 to the object 1.

This ability to maintain the position of the fence 300 with respect to the object 1, solely and exclusively by manual force, means that there is no requirement for a locking means to lock the saw guide 5 to the object.

This avoidance of a mandatory locking means is a substantial advantage when the user has to make several hundreds angle-cuts per day. For professional carpenters, who can often make around 300 or more angle-cuts per day, the avoidance of 30-60 seconds per cut—which would otherwise be needed to tighten and un-tighten the locking means—can save several hours per day.

Implicit in this ability to maintain the position of the fence 300 by manual force is the fact that the embodiment of the saw guide 5 has to be portable. For this reason, embodiments of the present invention specifically excludes use with non-portable power tools which are not originally designed for, and which cannot ordinarily be used, as a hand-held tool.

In other modified embodiments, the fence 300 may, however, be provided with an optional and non-mandatory locking means adapted to lock the fence 300 to the object. This means that the cutting-guide can function without the locking means. (In this regard, the locking mechanisms in the Stojanovski and Stocker prior art are considered to be non-optional and mandatory, because these prior art devices cannot function properly unless their anchor devices are locked in place. This is in contrast to the present embodiment of the invention, which can function without operation of a locking mechanism).

Variation of the Selected Angle

The track 100 is pivotally connected to the fence 300. In FIGS. 2A, 2B and 2C, this pivotal connection of the track 100 to the fence 300 enables the user to arrange and orient the track 100 at different selected angles, relative to the fence.

The angle of the track 100, relative to the fence 300, defines the user-selected angle at which the power saw 20 will create the angle-cut in the object 1.

The saw guide 5 is provided with a variable-angle mechanism that adjustably fastens the track 100 to the fence 300 at a variably selected angle relative to one another. The angle is chosen by the user.

In the embodiment of FIG. 2A, the variable-angle mechanism includes a position-locking means to lock the track 100 at the selected angle. The position-locking means is in the form of a rotational screw (not shown) that acts at the location of the pivot point 400. The user orientates the track 100 at the selected angle relative to the fence 300, and then uses the rotational screw (not shown) to clamp or lock the track 100 and fence 300 together in the selected angle.

Thus, in use, the power saw 20 travels on and along the track 100 so as to cut the object 1 in a straight line at the angle selected by the user.

The user begins the cut by pushing the saw 20 towards the fence 300, and as the object is cut, the user finishes the cut by pushing the saw away from the fence.

Separation of the Pivot Point from the Track

The track 100 pivots relative to the fence 300 about a pivot point 400. In the embodiment of FIG. 2A, the pivot point 400 is located on a part of the fence 300.

In FIG. 2A, the pivot point 400 is distanced from the track 100 (as shown by the letter y in FIG. 2A).

The track 100 has a leading edge 101 which is defined as being the edge that, in use, is closer to the saw blade of the saw 20. In FIG. 2A, the leading edge of the track 100 extends for the entire length of the track, from one end to the other.

The pivot point 400 is distanced from the leading edge 101 such that the entire leading edge 101 is able to pivot around and about the pivot point 400.

The pivot point 400 is also distanced from an intersection 450 of the track 100 and the fence 300, as indicated in FIG. 2A.

Figure 1A:
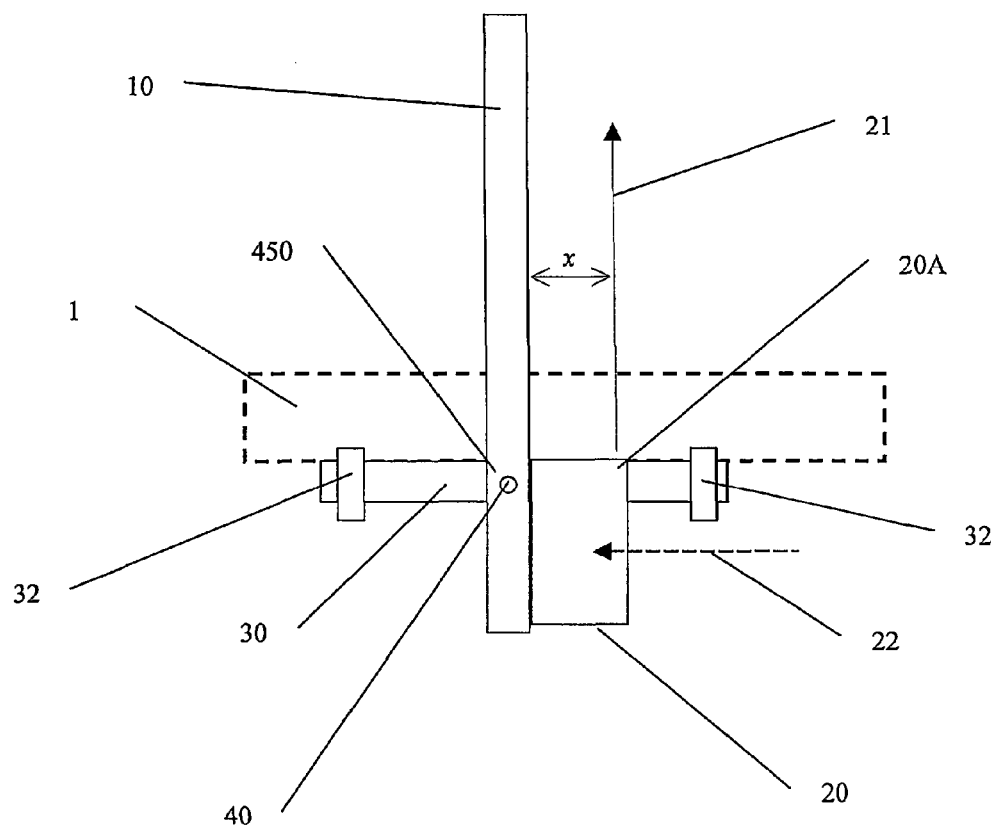
Figure 1B:
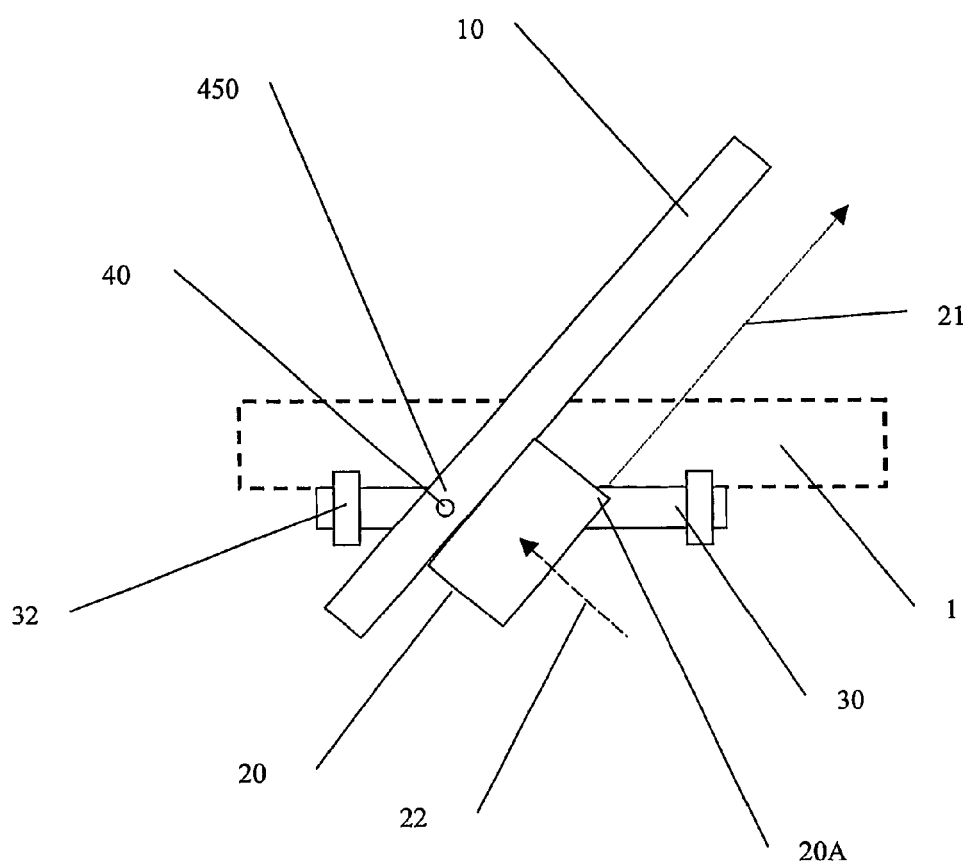
Figure 1C:
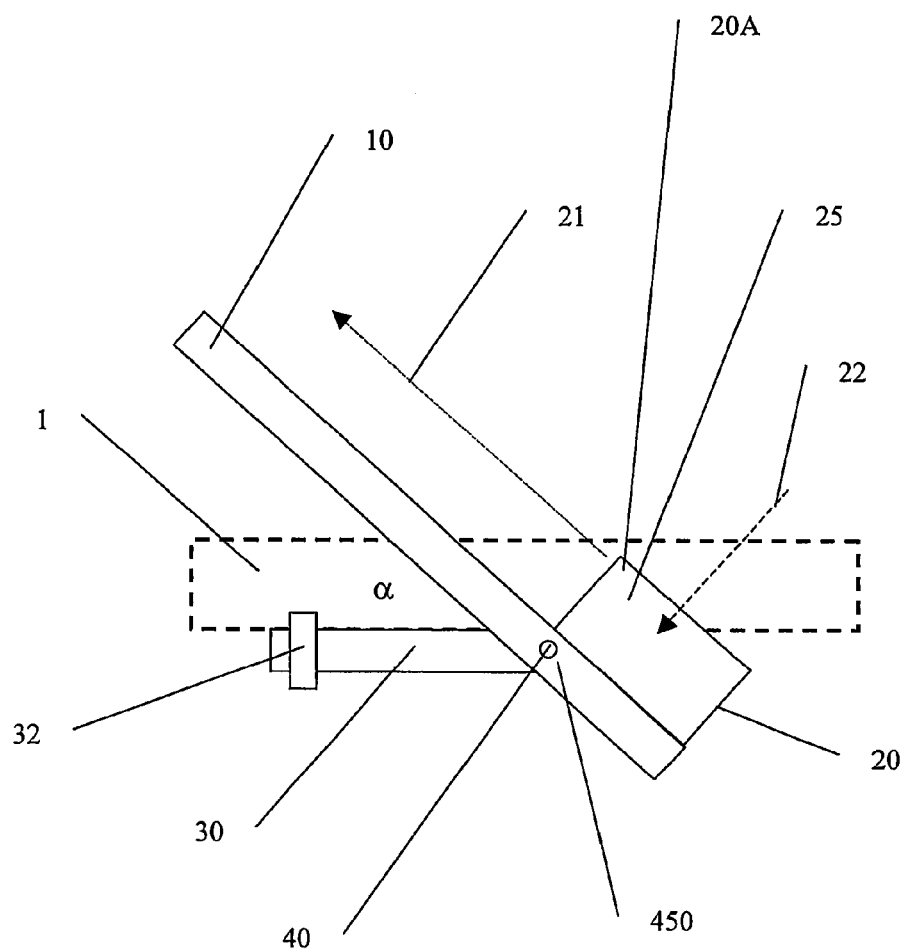
Figure 1C:
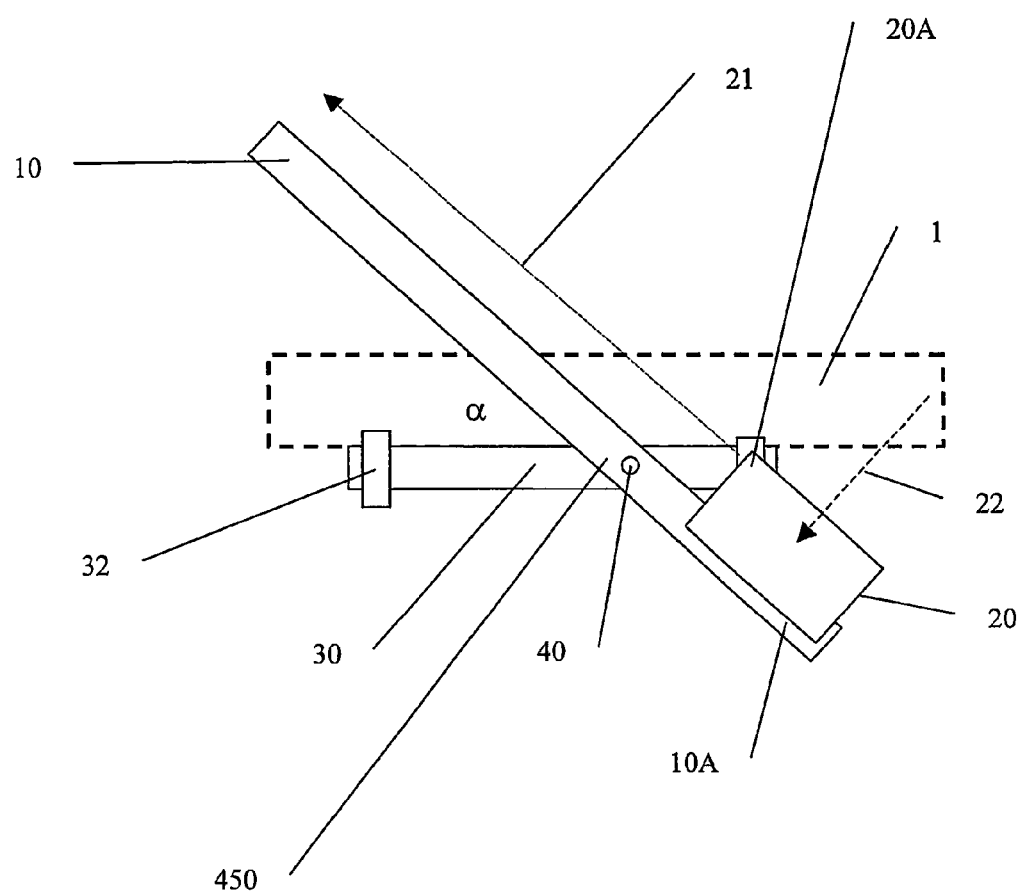
Figure 1D:
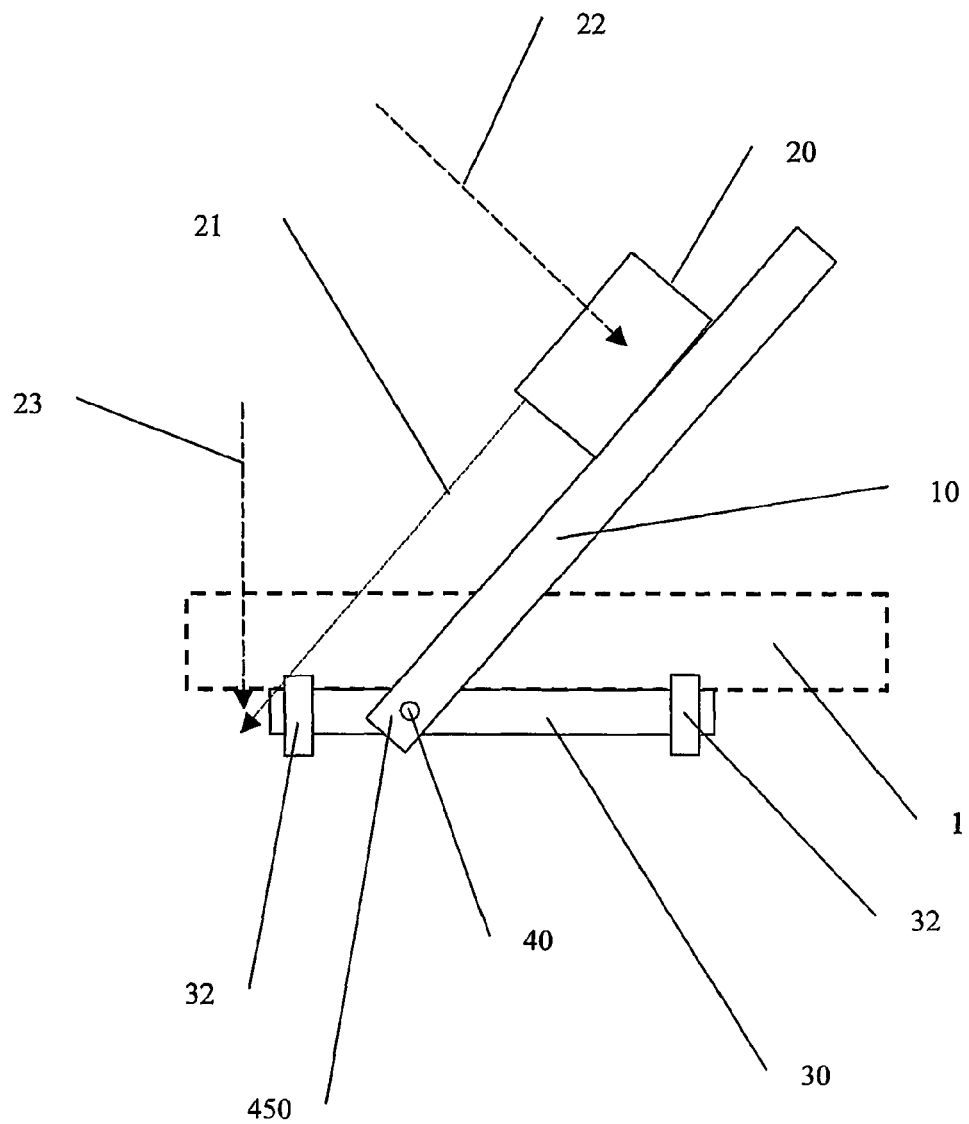

This separation of the pivot point 400 from the track 100 serves to avoid the problem in prior art FIG. 1C.

In various embodiments, the distance between the pivot point 400 and the track 100, an be achieved in a variety of ways. In FIG. 2A, this distance is created by an extended fin 10 that projects outwardly and laterally from a side of the track 100. The pivot point 400 is located at the end of the projecting fin 410.

An advantage of separating or distancing the pivot point 400 from the track 100 is appreciated by comparing FIG. 2C with prior art FIG. 1C.

In FIG. 2C, the track is arranged at an acute angle, with the saw positioned at the beginning of the track, before it is pushed forward along the track. The saw 20 is able to be draw back sufficiently such that, before performing the cut, there is a space between the blade of the saw 20 and the object 1. The user can commence sawing by pushing the rotating blade 13 of the saw into the object 1.

Specifically, the embodiment of FIG. 2C avoids the problem of FIG. 1C where the blade of the saw 20 is positioned over and above the object 1, even before the saw commences its cut.

In FIG. 2C, before the saw commences the cut, the blade of the saw is able to positioned as close as possible to the front 1A of the object 1, while ensuring that the centre of gravity of the saw is as close as possible to pivot point 400 and to the fence 300. Thus, it also avoids the problem of FIG. 1CC where the saw is perched at the end of a long, unstable cantilever. It can be appreciated that a long, unstable cantilever would be unsuitable in a portable hand-operated apparatus, and so the avoidance of this allows the saw guide 5 to be operated more conveniently as a portable apparatus.

In FIG. 2C, the saw is positioned as close as possible to the object, which is an ideal position for the user to commence pushing the saw along the track 100.

In other embodiments, the end or finish of the track 100 may be provided with an extension and retraction mechanism to selectively vary the length of the cutting-guide. This is useful when cutting objects 1 that are great in width.

Second Embodiment

The Track

FIG. 3A shows a second embodiment of a portable saw guide 6 which includes a linear track 100. The track 100 enables a portable power saw 20 to reciprocate, and travel on and along the track 100 in a perfectly straight line.

FIGS. 4A and 4AA show perspective views of the embodiment of FIG. 3A. FIG. 4A shows the embodiment with the saw 20 at the lower-end or start of the track 100, while FIG. 4AA shows the same embodiment except with the saw having been moved along the track to the other end or the finish.

FIG. 5A shows a side view of FIGS. 3A and 4A, while FIG. 5B shows a front view of FIGS. 3A and 4A.

The Fence

In FIG. 3A, the saw guide 6 includes a portable fence 300.

In the embodiment of FIG. 3A, the fence 300 is an elongated flat piece that is adapted, in use, to be positioned motionless relative to the object 1 to be cut.

The fence 300 has a flat face 310 that is able to sit flush with, and abut the object 1.

The user presses the flat front-face 310 of the fence 300 so that it abuts a flat edge of the object 1, and is held motionless relative to the object 1.

The user cuts the object by pushing the saw 20 on and along the track 100, and not by pulling. The user begins the cut by pushing the saw 20 towards the fence 300, and as the object is cut, the user finishes the cut by pushing the saw away from the fence.

The fence 300 can be positioned correctly by being held against the object 1 by the user's manual force. In the embodiment, since the saw is connected to the track, at least part of the manual force, which the user pushes the saw 20 forwards along the track 100 to cut the object, is also used to holds the fence 300 against the object 1. Thus, the forwards manual force, that pushes the saw, also serves a secondary purpose of keeping the fence 300 pressed against the object 1.

Since the user's manual force holds the fence in place, the fence 300 is able to be positioned and held against the object 1 without the mandatory requirement of a locking means, that would otherwise be needed to lock the fence 300 to the object 1.

The fence 300 may, however, be provided with an optional and not mandatory locking means adapted to lock the fence 300 to the object. In other words, the user need not use a locking means, although the apparatus can be provided with such a locking means to give the user the non-mandatory option.

This avoidance of a mandatory locking means is a substantial advantage when the user has to make several hundreds angle-cuts per day. For professional carpenters, who can often make around 300 or more angle-cuts per day, the avoidance of 30-60 seconds per cut—which would otherwise be needed to tighten and un-tighten the locking means—can save several hours per day.

In FIGS. 3A and 4A, one end of the fence 300 is provided with a stabilizing tab 320. In use, this tab 320 sits on an edge of the object 1, and prevents the apparatus from rotating around the longitudinal axis of the track 100.

Also, in FIG. 3AAA, the under-surface of the track, around the region of numeral 450, also performs the same function as the tab 320. Both these components, acting together, prevent the cutting-guidance apparatus from twisting around the longitudinal axis of the track 100.

The track 100 is pivotally connected to the fence 300. As can be appreciated, from FIGS. 3A, 3B and 3C, this pivotal connection of the track 100 and fence 300 enables the track 100 to be arranged at different angles relative to one another. The angle of the track 100, relative to the fence 300, effectively defines the angle at which the power saw 20 will cut the object 1.

The track 100 pivots relative to the fence 300 about a pivot point 400.

The track 100 may be provided with an extension and retraction mechanism to selectively vary the length of the cutting-guide. For instance, the end of the track, which is furthest from the pivot point 400, can be adapted to have another track piece that can be connected to the end of the track 100 to extend the length.

Separation of the Pivot Point from the Track

In FIG. 3A, the pivot point 400 is distanced from the leading edge 101 of the track 100. As best seen in FIG. 3AA, the pivot point 400 is separated from the leading edge 101 of the track 100 by a distance y.

As defined above, the leading edge 101 is defined as being the edge that, in use, is closer to the saw blade of the saw 20. In FIG. 3A and FIG. 3AAA, the leading edge 101 of the track 100 extends for the entire length of the track, from one end to the other.

The pivot point 400 is distanced from the leading edge 101 such that the entire leading edge 101 is able to pivot around and about the pivot point 400.

Specifically, the pivot point 400 is not located at an intersection of the track 100 and the fence 300. (This is a distinction from the prior art concepts in FIGS. 1A, 1B and 1C, where the intersection-point 450 is indeed located at an intersection of the track 10 and the anchor 30. In other words, in prior art FIG. 1C, the pivotal axis 40 passed through the track 10 itself, rather than being distanced from it).

Figure 3B:
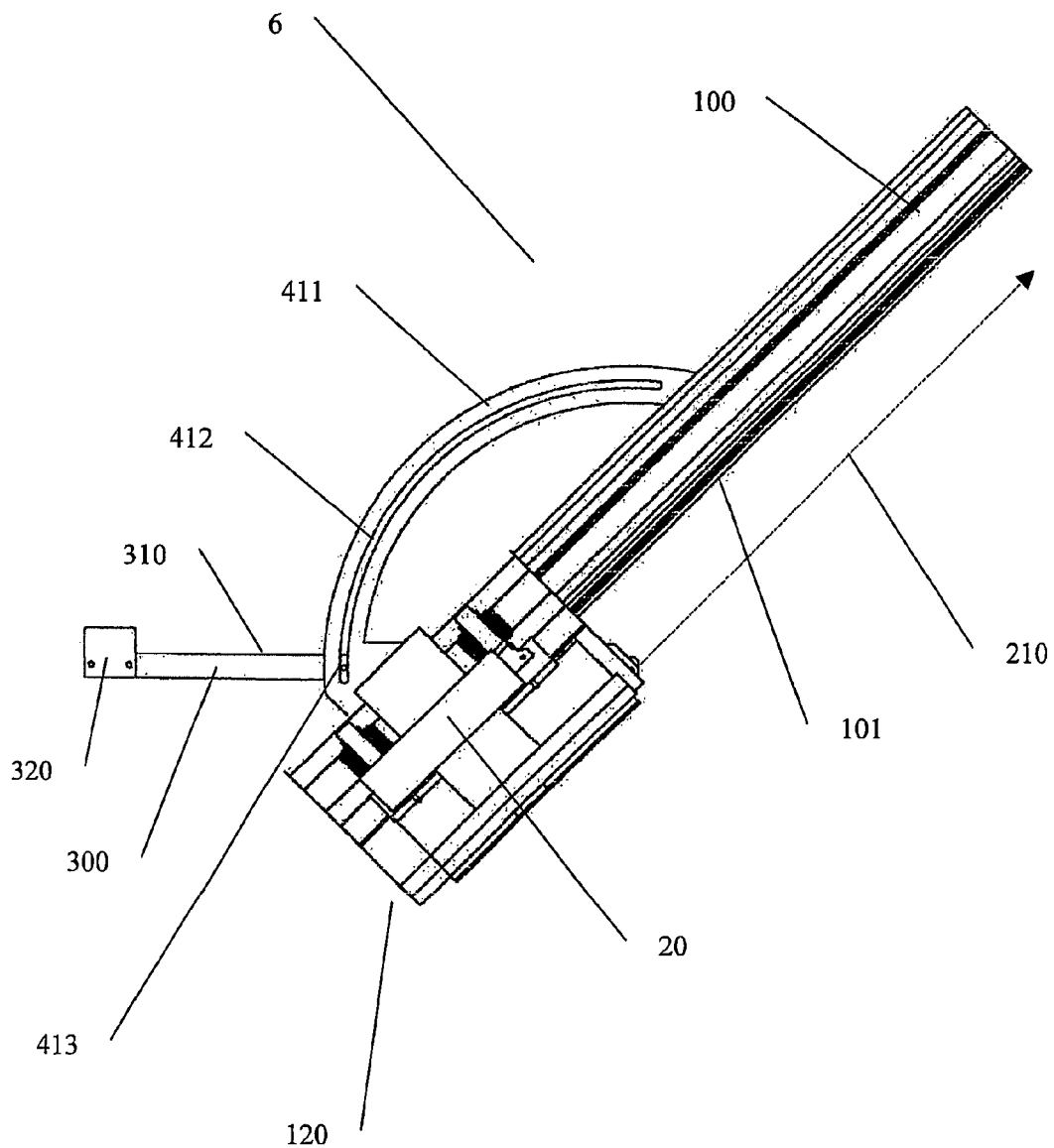
Figure 3C:
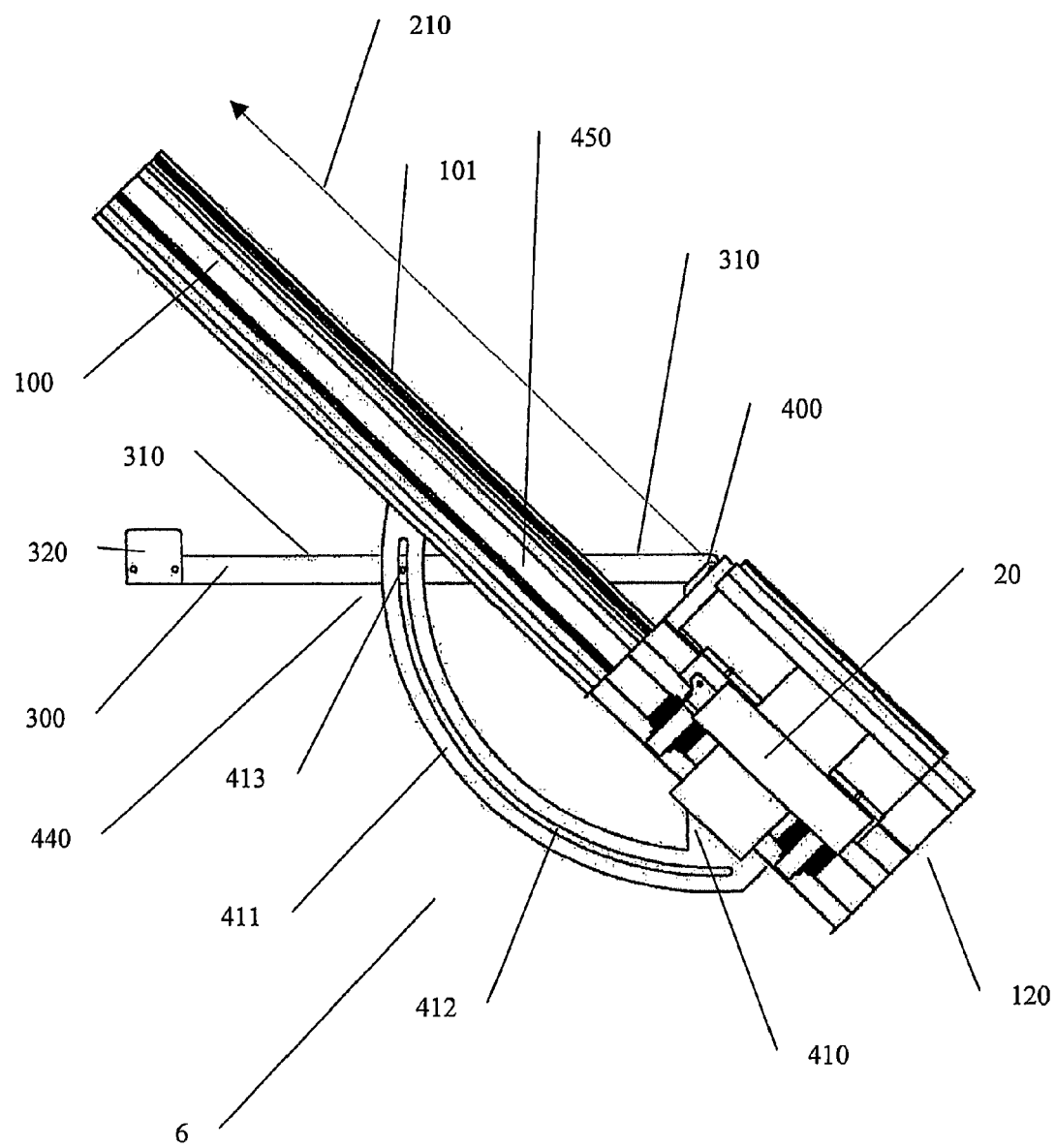

An advantage of this displacement or distancing of the pivot point 400 from the leading edge 101 is seen in FIG. 3C, as compared to prior art FIG. 1C.

In FIG. 3C, the track 100 is arranged at an acute angle, with the saw 20 positioned at the start of the track, before it begins its cutting motion along the track. The saw 20 is able to be draw back sufficiently to position the saw 20 ready to perform the cut. Before performing the cut, there is a space between the circular blade 13 of the saw 20 and the object 1, so that the user can commence cutting by pushing the rotating blade 13 into the object 1.

In contrast to FIG. 1C, the saw blade in FIG. 3C is not located over and above the object 1.

In the embodiment of FIG. 3A, this distance is created by an extended arm 410 that is connected to the track 100. The arm 410 is best seen in FIG. 3AA and FIG. 3AAA.

In FIG. 3C, before the saw 20 commences the cut, the blade of the saw is able to positioned as close as possible to the front of the object, while ensuring that the centre of gravity of the saw is as close as possible to pivot point 400 and the fence 300. Thus, the embodiment in the series of FIGS. 3A to 3C also avoids the problem of FIG. 1CC where the saw perched at the end of a long, unstable cantilever. Since the present embodiment is designed specifically as a portable arrangement, it would have presented a problem if there had to be such a long, unstable cantilever. A long, unstable cantilever would make it very difficult to achieve the advantage of the user 2 being able to lift and operate, with one hand 2A, the entire portable cutting-guidance apparatus as one integral unit In FIG. 3C, the saw is positioned as close as possible to the object, which is an ideal position for the user to commence pushing a power saw along the guide.

Variation of the Selected Angle

In FIGS. 3A, 3B and 3C, the saw guide 6 is provided with a variable-angle mechanism that enables the user to orientate, and releasably fasten or lock the track 100 in a range of angles, relative to the fence 300.

The variable-angle mechanism includes a curved-support 411 which supports the track 100, while the track pivots through a range of angles, relative to the fence 300. In FIG. 3A, the curved-support 411 resembles a curved protractor.

The curved-support 411 may be calibrated with markings of angle measurements, so that the user can select a precisely calibrated angle.

The combination of the track 100, the extended arm 410 and the curved support 411 altogether act as an integral unit. Therefore, this combination 100, 410, 411 rotates about the pivot point 400 as if it were one item.

In the embodiment of FIG. 3A, the track 100 is permanently supported by the combination of the extended arm 410 and curved support 411. The permanent support occurs at two locations 430A, 430B, as seen in FIG. 3AAA and FIG. 3AAAA. At these two locations 430A, 430B, the track 100 is physically connected to the arm 410 and the curved support 411.

Therefore, the rotational movement of the arm 410 and support 411, about the pivot point 400, effectively enables the track 100 to rotate around the pivot point. Thus, the user is able to orientate the track 100 at a selected angle relative to the fence 300, so that the object 1 can be cut at this angle selected by the user.

At the region generally indicated in FIG. 3A by reference numeral 440, the curved support 411 is supported by a section of the fence 300. Here, in this region 440, there is no permanent connection between the support 411 and the fence 300, since the curved support is adapted to rotate around the pivot point 400. At this region 440, different portions of the curved support 411 will be supported by the fence 300, depending on the selected angle. Thus, the curved support 411 merely rests on the fence 300.

In order to guide the circular motion of the curved support 411, the curved support 411 is provided with a curved slit 412. The slit 412 lines along a central region of the support 411. The slit 412 follows the curvature of the support 411.

An upstanding post 413 is located on an upper surface of the fence 300. Both the post 413, and the curved slit 412, each lie on a circumference of a notional circle defined with the pivot point 400 at the centre of the circle. The post 413 is fixed and motionless. As the track 100 pivots about the pivot point 400, the support 411 likewise pivots around the same pivot 400. The post 413 rides within the curved slit 412 to ensure that the rotational movement of the arm 410 and curved support 411 experiences a minimum of wobble.

The variable-angle mechanism includes a position-locking means to lock the track 100 in the selected angle. This locks the track 100 to the fence in the selected angle. In the embodiment, the locking of the track in the selected angle can occur at the location 440 where the curved support rests on the fence 300. The locking can also occur at the pivot point 400. Alternatively, the locking can occur at both these locations 440, 400. The locking can also occur at any point where the track 100, or its supporting structure 410, 411, meets the fence 300.

In the embodiment, the position-locking means is in the form of screw-threaded nut and bolt which screws down to hold the track 100 and its support structure against the fence 300.

Cutting-Tool Guide

In the embodiment of FIG. 3A, the saw is indirectly connected to the track 100.

Compare FIGS. 4A and 4AAA.

FIG. 4AAA shows the embodiment of FIGS. 3A and 4A without the saw attached, and hence FIG. 4AAA reveals that the track 100 is provided with a cutting-tool support in the form of track-runner 120. The track-runner 120 reciprocates back and forth along the track 100.

The portable power saw 20 is able to be releasably attached to the track-runner 120, and for this purpose the track-runner is provided with a releasable-fastening-means which includes several components.

In FIG. 7, the saw 20 is attached to the track 100 via the track runner 120. The user 2 is able to lift, with one hand 2A, the entire portable cutting-guidance apparatus as one integral unit with the saw 20 attached.

Method of Use: Increase in Time-Efficiency

Referring to FIG. 7, the user is able to lift the integral unit 6, 20 by using one hand to grasp the saw 20 in a manner in which the saw is designed to be handled normally as a portable tool. In so doing, the user can lift the entire assembly 6, 20 consisting of the saw 20 attached to the saw guide 6.

In order to make the linear cut in the object, the user first positions the flat face 310 of the fence 300 against the object 1 in correct alignment.

The manual force, that is used to keep the fence 300 pressed against the object, also includes the force with which the user pushes the saw forwards. In other words, as the user begins to push the saw forwards to make the cut, that same forwards motion is also serving to press the fence 300 against the object 1.

Therefore, the same forwards hand motion serves the dual purpose of keeping the fence 300 pressed against the object 1, as well as pushing the saw 20 forwards to make the cut.

In use, as in FIG. 7, the user 2 uses one hand 2A to lift the entire assembly 6, 20 (the saw attached to the saw guide). With a forwards motion, the user positions and presses the fence 300 against the object. Then, with the same forwards motion, he pushes the saw 20 forwards to make the cut. Following that, the user again lifts the entire assembly 6, 20 and re-positions the saw for the next cut.

The cycle, from one cut to the next cut, can take a matter of a handful of seconds, typically around 5 to 10 seconds, or thereabouts. This dramatically short time, between performing one cut to the next cut, is impossible when using prior art saw guides that are required to be bolted or fastened in place, because the bolting or fastening takes up a lot of time.

This very short cycle time, from cut to cut, is possible because the fence 300 is not required to be fastened to the object 1. This allows a dramatic increase in time-efficiency, because if the user were a professional carpenter making, say, 300 such cuts a day, the total time per day spent aligning the cuts is dramatically shorter, compared to the several lost hours if using the prior art saw guides discussed above.

Attachment Systems

In FIG. 4AAA, to facilitate attachment of the saw 20, the track runner has a side platform 121 which conforms to the shape of the underside of the housing of the saw 20. Part of the saw is able to be supported by the side platform 121.

The side platform 121 is provided with a clamping member 122 that is able to clamp the saw to the platform 121.

Most portable power saws on the market have an upwardly-turned lip on the under-surface of the saw. When the saw is positioned on the side platform 121, the clamping member 122 sandwiches the lip of the saw between the member 122 and the surface of the platform 121. The lip is then held firmly in place by a clamping mechanism 123 (shown in FIG. 4AAA) which holds the clamping member 122 immovable. Thus, the saw 20 is able to be firmly attached or clamped to the track-runner 120.

In use, when the saw 20 is firmly clamped to the track-runner 120, the power saw 20 can be pushed forwards along the track 100 to achieve a perfectly straight cut of the object 1, and to also move backwards to reposition the saw for the next cut.

The saw 20 is removably attached to the track 100, and can be removed by releasing the clamping mechanisms 123.

The track 100 include a glide mechanism that allows the track-runner 120 to travel smoothly along the cutting-guide. FIG. 6A shows a cross-sectional front view of the track 100 and the track-runner 120. FIG. 6B is an exploded view of FIG. 6A, showing the components in greater detail.

In FIGS. 6A and 6B, the glide mechanism includes one or more linear ribs 130 on the upper surface of the track 100. Corresponding grooves or channels 131 are located on the under-surface of the running-track 120. The grooves or channels 131 are able to ride or glide on the corresponding ribs 130. The ribs 130 and grooves 131 extended along substantially the entire length of the track 100.

The fit of the rounded-ribs 130 within the cylindrical grooves 131 means that, once the linear ribs 130 are running within the elongated grooves 131, the ribs can only move forwards and backwards along the groove.

In other words, the ribs cannot move upwards or downwards. Thus, the user need not apply a sideways force 22 (as in FIG. 1A) to maintain the saw against the track 100. Also, the shape of the rounded ribs 130 within the grooves also means that the ribs cannot move up and down inside the groove. Thus, the user need not apply a sideways downwards force to maintain the saw on top of the track 100.

In other embodiments, a kinematic inversion can involve the glide mechanism including one or more linear channels (not shown) in the surface of the track 100. Corresponding ribs are located on the under-surface of the running-track 120. The ribs are able to glide on the corresponding grooves.

In the cross-sectional FIG. 6B, the linear ribs 130 are provided with self-lubricating bearings or bearing-guides 140 which reduce the friction between the inner surfaces of the ribs 130 and grooves 131. These bearings are made of neoprene or other suitable material for reducing friction of moving mechanical parts.

The invention is not limited to a particular design appearance of the track 100. The embodiment of the track and clamping device in the series in FIGS. 3 and 4 represents merely an example.

In the present embodiment, the track-runner 120 ensures that the power saw 20 moves perfectly linearly along the track 100. Hence, the user does not need to exert a sideways force 22 to maintain the saw 20 sideways up against the linear guide to keep it aligned with the track 100.

The only force the user exerts need to exert is a forwards force in line with the longitudinal axis of the track 100. Since the user does not exert a sideways 22 force on the saw, it is one factor that avoids the need for a locking or clamping mechanism to lock the fence 300 to the object 1. This is because, in FIG. 3A as well as in FIGS. 3B and 3C, the user's force which pushes the saw forwards along the track, is sufficient to hold the fence 300 against the object 1.

As mentioned, avoiding the need to lock or clamp the fence 300 to the object 1 can save several hours of time per day when the user is, for example, a professional carpenter who needs to make several hundred of such cuts per day. The saving of 30-60 seconds per cut, through not needing to clamp the apparatus before cutting, can amount to several hours per day when the user makes, for example, 300 cuts per day.

Also, the use of a cutting-tool support in the embodiment keeps the saw travelling on a perfectly linear path along the track 100, and thus prevents the circular saw from veering off course due to forces that comes from the rotating blade 13 of the saw 20.

Location Of The Pivot Point With Respect To The Line Of Cut

FIG. 5B is a front-view of the saw guide 6. The track 100 and the track-runner 120 are positioned above the fence 300, such that the track-runner 120 is able to pass across the fence 300 without hindrance, as it travels along the track.

In hand-held power saws, a circular blade 13 usually lies in a plane that is located to one side of the saw housing, and hence in the series of drawings FIGS. 3 and 4, the line of cut of the circular blade 13 is shown as a dotted-arrow 210.

When the power saw 20 is attached to the track-runner 120, the line of cut 210 preferably passes as close as practically possible to the pivot point 400. This is achieved because the saw blade 13 is distanced from the leading edge 101 of the track 100 by a measure. This measure is not equal to, but is substantially equivalent to the distance between the pivot point 400 and the same edge 101 of the cutting-guide 100.

It is advantageous for the line of cut 210 to be as close as possible to the pivot point 400. This is because the pivot point defines the point of reference for determining the angle between the track 100 and the fence 300. The selected angle is actually defined as the angle between, i) a line that passes through the fence and the pivot point, and ii) a line which passes through the pivot point and which is parallel to the track. Thus, when the user aligns the selected angle, the intention is to create a cut that is as close as possible to the pivot point.

If the line of cut did not pass close to the pivot point 400—as is the case in a number of prior art saw guides—then a problem would be that, whenever the user changes the selected angle, there will be a considerable change in the point at which the line of cut crosses the object 1 to be cut.

For instance, in each of FIGS. 1A, 1B and 1C, there is a noticeable change in the point at which the line of cut crosses the object 1. In contrast, in FIGS. 3A, 3B and 3C, the point at which the line of cut crosses the object 1 consistently remains around the pivot point 400.

By having the line of cut 210 as close as practically possible to the pivot point 400, it means that the user can adjust the selected angle, without significantly altering the point at which the object 1 is cut. For instance, when considering FIGS. 3A, 3B and 3C, it is appreciated that, irrespective of the selected angle, the line of cut 21 always passes substantially close to the pivot point or pivotal axis 400. In other words, when the user changes the selected angle, the user does not need to re-position the fence 300 with respect to the object. A few seconds saved, by not having to readjust the position, when the user has to make several hundred cuts per day.

In the embodiments, the intention is for the line of cut 210 to be as close as possible to the pivot point, but in the practical embodiment in the series of drawings in FIGS. 3 and 4, the measure exceeds the distance by approximately 10 mm, i.e. the line of cut is about 10 mm away from the pivot point 400. This is considerably closer than would be the case if, as in the prior art, the pivot point were to be on the track 100. This is because the running-track 120 is shaped to accept a range of typical power saws 20 with different sized blade, such as as 6¼ inch, 7¼ inch, 8.25 inch, and 9.25 inch diameter blades. As the size of the saw blades increases, the size of the housing of the saw increases slightly, which causes the line of cut 210 to be located progressively away from the pivot point 400 by a slight amount.

In practice, however, even for the largest hand-held saws currently available on the market, it is found that the gap between the pivot point and the line of cut is no more than around 9 mm to 15 mm, which is considered an acceptable range. In practice, it does not significantly detract from the performance of the accessory apparatus.

Nevertheless, the larger hand-held saws, that would yield a gap of around 15 mm, tend to be less commonly used by tradesmen. Hence, it is found that the majority of commonly used saws would have very small gaps between the line of cut and the pivot point.

The position of the line of cut 21 varies, ever so slightly, depending on the size of the saw 20 produced by different manufacturers. (It so happens that this variation between different manufacturers is very small).

From FIG. 4A, it can be appreciated that the user cannot actually see the actual saw blade 13 when handling the saw in the normal position. Therefore, the front edge of the track-runner 120 may be provided with an adjustable marker. The marker can be shifted laterally along the leading edge of the track-runner 120. The user can makes a few test cuts on a scrap object 1, and adjust the marker to align with the line of cut produced by the particular saw 20. This helps the user know where the cut will be produced.

In the present embodiments, the saw guide and its components are made mostly of aluminium, which provides sufficient strength and stiffness without excessive weight. However, other materials may be used, such as steel, and even lighter materials such as rigid plastic and composite materials such as fibreglass or carbon fibre.

The present invention, in its broadest aspect, is limited to the field of portable powertools which are hand-held when being used. Specifically, the present invention excludes power tools which are so heavy as to be regarded as non-portable, and which ordinarily have to be placed on a bench or other work-surface when being used. Thus, embodiments of the invention can be used as an accessory for portable hand-held power tools.

Although the embodiments have been described in the context of hand-held circular power saws, other modifications may be used with other hand-held cutting tools, such as a portable jig-saw.

In other embodiments, the appearance of the fence 300 can be modified, provided it fulfils the function of a positioning-means. For instance, rather than having a flat front face, a modified fence may have a series of projections of equal size that confront the front surface of the object 1.

Comparing the fin 410 of the first embodiment, with the functionally-similar extended arm 410 and curved support 411 in the second embodiment, it is evident there are numerous variations for extending the pivot point 400 away from an edge of the track 100.

The embodiments have been advanced by way of example only, and modifications are possible within the scope of the invention as defined by the appended claims

The invention claimed is:

1. A portable cutting-guidance apparatus adapted to be used with a portable power cutting-tool that has a cutting implement which cuts an object at a variably selected angle, including:

a portable positioning means adapted, in use, to be positioned motionless relative to an object to be cut by a portable power cutting-tool; and a linear cutting-guide adapted to enable the portable power cutting-tool to travel on and along the cutting-guide in a straight line;

the linear cutting-guide being pivotally connected to the positioning means about a pivot point and its associated pivot axis by a variable-angle mechanism that is adapted to adjustably fasten the cutting-guide to the positioning means at a variably selected angle relative to one another, such that, in use, the portable power cutting-tool is able to travel on and along the cutting-guide to cut the object in a straight line at the variably selected angle;

wherein the positioning means includes an abutment surface adapted, in use, to abut the object so as to position the positioning means motionless relative to the object, and wherein the positioning means is adapted, in use, to be positioned and held against the object by manual force of the user, the manual force including force with which the user pushes the portable power cutting-tool forwards along the cutting-guide to cut the object, wherein the portable cutting-tool is removably attachable to the linear cutting guide such that the cutting-tool is able to reciprocate back and forth along the cutting guide while attached thereto, wherein the cutting-guide is provided with a cutting-tool support adapted to travel along the cutting-guide, and adapted to have the portable cutting-tool attached thereto such that, in use, when the cutting-tool is attached to the linear saw guide, the user is able to lift and operate with one hand the entire portable cutting-guidance apparatus as one integral unit with the cutting-tool attached, wherein the linear cutting-guide has a leading edge which, in use is closest to the cutting implement, wherein the pivot point is distanced from the leading edge of the cutting-guide such that the entire leading edge is able to pivot around and about the pivot point, wherein the pivot point and the cutting implement are located on the same side of the linear cutting guide with no part of the linear cutting guide coming between the cutting implement and the pivot point and its associated pivot axis, and wherein, when the portable cutting-tool is attached to the cutting-tool support, the cutting implement is distanced between the pivot point and the leading edge of the cutting-guide such that when the positioning means is held against the object by the manual force of the user, it is possible to adjust the selected angle of the cut without significantly altering the point at which the object is cut.

2. An apparatus of claim 1 wherein the positioning means is adapted, in use, to be positioned and held against the object without requiring a locking means that would otherwise lock the positioning means to the object.

3. An apparatus of claim 1 wherein the pivot point is distanced from an intersection of the cutting-guide and the positioning means.

4. An apparatus of claim 1 wherein the positioning means is adapted, in use, to be positioned and held against the object without requiring a locking means that would otherwise lock the positioning means to the object, and wherein the leading edge of the linear cutting-guide, in use, is closest to the cutting implement, and wherein the pivot point is distanced from the leading edge of the cutting-guide such that the entire leading edge is able to pivot around and about the pivot point, and the pivot point is also distanced from an intersection of the cutting-guide and the positioning means, and wherein the portable cutting-tool is removably attachable to the linear cutting guide such that the cutting-tool is able to reciprocate back and forth along the cutting-guide while attached thereto.

5. An apparatus of claim 1 wherein the user is able to lift the integral unit by grasping the cutting-tool in a manner in which the cutting-tool is designed to be handled as a portable tool.

6. An apparatus of claim 5 wherein the cutting-guide includes a glide mechanism that allows the cutting-tool support to travel smoothly along the cutting-guide with a degree of friction.

7. An apparatus of claim 6 wherein the glide mechanism includes one or more linear ribs on the cutting-guide surface on which corresponding one or more grooves located on an under-surface of the cutting-tool support are able to glide.

8. An apparatus of claim 6 wherein the glide mechanism includes one or more linear grooves in the cutting-guide surface in which corresponding one or more ribs located on an under-surface of the cutting-tool support are able to glide.

9. An apparatus of claim 1 wherein the cutting-tool support is provided with a releasable fastening means adapted to releasably fasten the cutting-tool to the cutting-tool support.

10. An apparatus of claim 9 wherein the releasable fastening means includes a clamping mechanism that clamps around a rim of the cutting-tool.

11. An apparatus of claim 1 wherein the cutting-guide and the cutting-tool support are positioned above the positioning means such that the cutting-tool support is able to pass across the positioning means without hindrance as it travels along the cutting-guide.

12. An apparatus of claim 1 wherein, when the portable cutting-tool is attached to the cutting-tool support, the cutting implement is distanced from the leading edge of the cutting-guide by a measure that is substantially equivalent to the distance between the pivot point and the leading edge of the cutting-guide.

13. An apparatus of claim 12 wherein the measure exceeds the distance by approximately 9 mm to 15 mm depending on the size of the housing of the saw.

14. An apparatus of claim 1 wherein the pivot point is located on the positioning means.

15. An apparatus of claim 1 wherein the variable-angle mechanism includes a curved-support which supports the cutting-guide as the cutting-guide pivots relative to the positioning means through a range of selectable angles.

16. An apparatus of claim 1 wherein the pivot point and cutting implement are located on the same side of the linear cutting guide with no part of the linear cutting guide coming between the cutting implement and the pivot point and its associated pivot axis in order that the line of cut is as close as possible to the pivot point so that it is possible to adjust the selected angle of the cut without significantly altering the point at which the object is cut.

17. An apparatus of claim 1 wherein the positioning means supports the pivot point such that the pivot point and cutting implement are located on the same side of the linear cutting guide with no part of the linear cutting guide coming between the cutting implement and the pivot point and its associated pivot axis in order that the line of cut is as close as possible to the pivot point so that it is possible to adjust the selected angle of the cut without significantly altering the point at which the object is cut.

* * * * *